US009181469B2

(12) United States Patent
Dobson, Jr. et al.

(10) Patent No.: US 9,181,469 B2
(45) Date of Patent: Nov. 10, 2015

(54) METHODS, SYSTEMS, AND COMPOSITIONS FOR THE CONTROLLED CROSSLINKING OF WELL SERVICING FLUIDS

(75) Inventors: James W. Dobson, Jr., Houston, TX (US); Shauna L. Hayden, Houston, TX (US); Kimberly A. Pierce, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 461 days.

(21) Appl. No.: 12/395,406

(22) Filed: Feb. 27, 2009

(65) Prior Publication Data
US 2010/0048429 A1 Feb. 25, 2010

Related U.S. Application Data

(60) Provisional application No. 61/032,703, filed on Feb. 29, 2008.

(51) Int. Cl.
*C09K 8/68* (2006.01)
*E21B 43/25* (2006.01)

(52) U.S. Cl.
CPC .................. *C09K 8/685* (2013.01); *E21B 43/25* (2013.01)

(58) Field of Classification Search
None
See application file for complete search history.

(56) References Cited

U.S. PATENT DOCUMENTS

| | | | |
|---|---|---|---|
| 3,337,292 A | 8/1967 | Wieder et al. | |
| 3,974,077 A * | 8/1976 | Free | 507/211 |
| 4,378,049 A | 3/1983 | Hsu et al. | |
| 4,470,915 A | 9/1984 | Conway | |
| 4,619,776 A | 10/1986 | Mondshine | |
| 4,620,596 A | 11/1986 | Mondshine | |
| 4,657,080 A | 4/1987 | Hodge | |
| 4,657,081 A | 4/1987 | Hodge | |
| 4,797,216 A | 1/1989 | Hodge | |
| 4,801,389 A | 1/1989 | Brannon et al. | |
| 4,861,500 A | 8/1989 | Hodge | |
| 5,082,579 A | 1/1992 | Dawson | |
| 5,160,643 A | 11/1992 | Dawson | |
| 5,271,466 A | 12/1993 | Harms | |
| 5,307,877 A | 5/1994 | Cowan et al. | |
| 5,363,918 A | 11/1994 | Cowan et al. | |
| 5,565,513 A | 10/1996 | Kinsey, III et al. | |
| 5,629,271 A * | 5/1997 | Dobson et al. | 507/269 |
| 5,658,861 A | 8/1997 | Nelson et al. | |
| 5,785,747 A | 7/1998 | Vollmer et al. | |
| 5,858,948 A | 1/1999 | Ghosh et al. | |
| 6,024,170 A | 2/2000 | McCabe et al. | |
| 6,148,917 A | 11/2000 | Brookey et al. | |
| 6,194,370 B1 | 2/2001 | Williams et al. | |
| 6,251,838 B1 | 6/2001 | Moorhouse et al. | |
| 6,310,008 B1 * | 10/2001 | Rietjens | 507/267 |
| 6,423,802 B1 | 7/2002 | Miller et al. | |
| 6,488,091 B1 | 12/2002 | Weaver et al. | |
| 6,642,185 B2 | 11/2003 | Crews | |
| 6,764,981 B1 | 7/2004 | Eoff et al. | |
| 6,838,417 B2 | 1/2005 | Bouwmeester et al. | |
| 7,018,956 B2 | 3/2006 | Dobson, Jr. et al. | |
| 2004/0035580 A1 | 2/2004 | Bouwmeester et al. | |
| 2004/0067854 A1* | 4/2004 | Dobson et al. | 507/200 |
| 2005/0075437 A1 | 4/2005 | Dinh et al. | |
| 2006/0116296 A1* | 6/2006 | Kippie et al. | 507/244 |
| 2006/0144592 A1 | 7/2006 | Hanes, Jr. et al. | |
| 2006/0205605 A1* | 9/2006 | Dessinges et al. | 507/211 |

FOREIGN PATENT DOCUMENTS

| | | |
|---|---|---|
| EP | 1 092 835 A | 4/2001 |
| EP | 1 331 358 A | 7/2003 |
| WO | 2007052048 A2 | 5/2007 |

OTHER PUBLICATIONS

Putzig, D.E.; St. Clair, J.D., "A New Delay Additive for Hydraulic Fracturing Fluids." SPE Paper No. 105066, pp. 1-5 (2007).

Penny, G.S., "An Evaluation of the Effects of Environmental Conditions and Fracturing Fluids Upon the Long-Term Conductivity of Proppants.", SPE Paper No. 16900, pp. 229-244 (1987).

Gulensoy, Huseyin; Savci, Hikmet, Solubilities of Some Calcium Minerals and Prepared Calcium Compounds in EDTA (Ethylene Diamine Tetraacetic Acid) Solutions. M.T.A. Bulk, No. 86, pp. 77-94 (1976).

Gulensoy, Huseyin; Kocakerim, Mehmed Muhtar, "Solubility of Ulexite in CO2-Containing Water." M.T.A. Bull, No. 87, pp. 36-47 (1978).

Gulensoy, Huseyin; Kocakerim, Mehmed Muhtar, "Solubility of Colemanite Mineral in CO2-Containing Water and Geological Formation of this Mineral.", Bull. Miner. Res. Explor. Inst. Turk., vol. 88 (No. 90), pp. 1-19 (Apr. 1978).

Erd, R.C.; McAllster, J.F.; and Vlisidis, A.C., "Nobleite, Another New Hydrous Calcium Borate from the Death Valley Region, California," American Mineralogist, vol. 46, pp. 560-571 (1961).

Yu, Z.-T.; Shi, Z.; Chen, W.; Jiang, Y.-S.; Yuan, H.-M.; and Chen, J.-S., "Synthesis and X-ray Crystal Structures of Two New Alkaline-Earth Metal Borates: SrBO2(OH) and Ba3B6O9(OH)6." J. Chem. Soc., Dalton Transaction, Issue 9, pp. 2031-2035 (2002).

Zhao, Z-Y.; and Cui, M., "The Rheology of Chinese XD and ZW Borate Crosslinked Fracturing Fluids and Their Proppant Transport Capability." SPE Paper No. 29991-MS, pp. 401-414 (1995).

(Continued)

*Primary Examiner* — Alicia Bland
(74) *Attorney, Agent, or Firm* — Lewis & Reese, PLLC

(57) ABSTRACT

Treating fluid compositions for use in hydrocarbon recovery operations from subterranean formations are described, as well as methods for their preparation and use. In particular, treating fluid compositions are described which comprise a liquid, a crosslinkable organic polymer material that is at least partially soluble in the liquid, a crosslinking agent that is capable of increasing the viscosity of the treating fluid by crosslinking the organic polymer material in the liquid, and a crosslinking modifier additive which can delay or accelerate the crosslinking of the treating fluid composition. Such compositions may be used in a variety of hydrocarbon recovery operations including fracturing operations, drilling operations, gravel packing operations, water control operations, and the like.

30 Claims, No Drawings

(56) References Cited

OTHER PUBLICATIONS

Rae, Phil; and Di Lullo, Gino, "Fracturing Fluids and Breaker Systems—A Review of the State-of-the-Art." SPE Paper No. 37359, pp. 237-248 (1996).

Ely, John W., "Fracturing Fluids and Additives.", in "Recent Advances in Hydraulic Fracturing Technology," Society of Petroleum Engineers, Inc., Gidley, J.L.; Holditch, S.A.; Nierode, D.E.; and Veatch Jr., R.W., Eds., Ch. 7, pp. 131-146 (1989).

Brannon, H.D.; and Ault, M.G., "New, Delayed Borate-Crosslinked Fluid Provides Improved Fracture Conductivity in High-Temperature Applications." SPE Paper No. 22838, pp. 215-227 (1991).

Tan, H.C.; Wesselowski, KS.; and Willingham, J.D., "Delayed Borate Crosslinked Fluids Minimize Pipe Friction Pressure." SPE Paper No. 24342-MS, pp. 305-316 (1992).

Ainley, B.R.; Nimerick, K.H.; and Card, R.J., "High-Temperature, Borate-Crosslinked Fracturing Fluids: A Comparison of Delay Methodology." SPE Paper No. 25463-MS, pp. 517-520 (1993).

International Search Report for corresponding International Patent Application No. PCT/US2009/035527, dated Jul. 3, 2009.

Written Opinion of the International Searching Authority for corresponding International Patent Application No. PCT/US2009/035527, dated Jul. 3, 2009.

\* cited by examiner

METHODS, SYSTEMS, AND COMPOSITIONS FOR THE CONTROLLED CROSSLINKING OF WELL SERVICING FLUIDS

CROSS REFERENCE TO RELATED APPLICATIONS

The present application claims priority to U.S. Provisional Patent Application Ser. No. 61/032,703, filed Feb. 29, 2008, the contents of all of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to compositions and methods for controlling the gelation rate in aqueous-based fluids useful in treating subterranean formations. More specifically, the present disclosure is related to improved compositions for use in the controlled gelation, or crosslinking, of polysaccharides in aqueous solutions with sparingly-soluble borates, as well as methods for their use in subterranean, hydrocarbon-recovery operations.

2. Description of the Related Art

Many subterranean, hydrocarbon-containing and/or producing reservoirs require one or more stimulation operations, such as hydraulic fracturing, in order to be effectively produced. Borates were some of the earliest crosslinking agents used to increase the viscosity and proppant-transport capabilities of aqueous, guar-based stimulation fluids, and have been used successfully in numerous low- to moderate-temperature (<200° F.) reservoirs. However, as hydrocarbon exploration capabilities expanded, the number of subterranean reservoirs being developed with temperatures greater than 200° F. increased, the conventional borate-salts used, and the resulting crosslinked fluids, were found to provide inadequate rheological stability.

Thus, as the development of high-temperature (>200° F.) well stimulation fluids were developed, an emphasis was placed on the maximization of the thermal stability of the rheological properties of the fluids. In particular, titanium and zirconium crosslinking agents were developed for their ability to provide stable, somewhat controlled, bonding in high-temperature subterranean environments.

Fracturing fluids that are crosslinked with titanate, zirconate, and/or borate ions (using compounds which generate these ions in the fluid), sometimes contain additives that are designed to delay the timing of the crosslinking reactions. Such crosslinking time delay agents permit the fracturing fluid to be pumped down hole to the subterranean formation before the crosslinking reaction begins to occur, thereby permitting more adaptability, versatility or flexibility in the fracturing fluid. Additionally, the use of these gelation control additives can be beneficial from an operational standpoint in completion operations, particularly because their use allows for a decrease in the amount of pressure required for pumping the well treating fluids. This in turn can result in reduced equipment requirements and decreased maintenance costs associated with pumps and pumping equipment. Examples of early crosslinking time delay agents that have been reported and have been incorporated into water-based fracturing fluids include organic polyols, such as sodium gluconate, sodium glucoheptonate, sorbitol, glyoxal, mannitol, phosphonates, and aminocarboxylic acids and their salts (EDTA, DTPA, etc.).

A number of additional classes of previously used delay additives and compounds for use in controlling the delay time and the ultimate viscosity of treating fluids, such as fracturing fluids, have been previously reported. As can be imagined, the gelation control additives and methods vary, depending upon whether the crosslinking agent is a borate-based crosslinker or a transition metal crosslinker (e.g., Zr or Ti). Generally, the agents used to slow the crosslinking of guar and guar-type fluids are polyfunctional organic materials which have chelating capabilities and can form strong bonds with the crosslinking agent itself. Several classes of agents have been described to date, especially for the controlled crosslinking by zirconium and titantium. For example, a hybrid delay agent having the trade name TYZOR® (DuPont) for the delay of viscosity development in fracturing fluids based on guar derivatives crosslinked with a variety of common zirconate and titanate crosslinkers under a wide pH range and under a variety of fluid conditions has been described by Putzig, et al [SPE Paper No. 105066, 2007]. Other delay agents for such organic transition-metal based crosslinkers include hydroxycarboxylic acids, such as those described in U.S. Pat. Nos. 4,797,216 and 4,861,500 to Hodge, selected polyhydroxycarboxylic acid having from 3 to 7 carbon atoms as described by Conway in U.S. Pat. No. 4,470,915, and alkanolamines such as triethanolamine-based delay agents available under the trade name TYZOR® (E.I. du Pont de Nemours and Co., Inc.). However, the use of many of these transition-metal based crosslinkers, and their often-times costly crosslink time delay additives have occasionally been associated with significant damage (often greater than 80%) to the permeability of the proppant pack when used in hydraulic fracturing operations, especially in formations having elevated temperatures [Penny, G. S., *SPE* 16900 (1987); *Investigation of the Effects of Fracturing Fluids Upon the Conductivity of Proppants*, Final Report, (1987) *STIM-LAB Inc. Proppant Consortium* (1988)].

A number of approaches to the control of the crosslinking process in fluids comprising fully-soluble borate crosslinkers have also been described. For example, a number of polyhydroxy compounds such as sugars, reduced sugars, and polyols such as glycerol have been reported to be delay agents for crosslinkers based on boron. Functionalized aldehyde-based and dialdehyde-based delay agents for fully-soluble borates, such as those described in U.S. Pat. Nos. 5,082,579 and 5,160,643 to Dawson, have also been reported. However, numerous of these gelation control agents for use in boron-based crosslinker compositions are highly pH and temperature dependent, and cannot be used reliably in subterranean environments having elevated pHs, e.g., a pH greater than 9 and/or temperatures greater than about 200° F.

The mechanism for delay in crosslinking time of organic polymer in fluids comprising sparingly-soluble borate-based crosslinkers has also been documented to some extent. As was described in U.S. Pat. No. 4,619,776 to Mondshine, the unique solubility characteristics of the alkaline earth metal borates or alkali metal alkaline earth metal borates enables them to be used in the controlled crosslinking of aqueous systems containing guar polymers. The rate of crosslinking could be controlled by suitable adjustment of one or more of the following variables—initial pH of the aqueous system, relative concentrations of one or more of the sparingly-soluble borates, temperature of the aqueous system, and particle size of the borate. However, there are several limitations in the aforementioned art for sparingly soluble borates which are incorporated in water-base crosslinking suspensions for fracturing operations—particle size/concentrations of the borate solids, and the initial pH of the guar solution.

At present, the primary method for varying crosslink times of a treatment fluid utilizing sparingly soluble borate is with modification of the borate particle size alone. Operational requirements for delayed crosslink times as fast as 30-45 seconds have not been accomplished with present technology. Smaller particles may sometimes decrease crosslink times, but even with milling and air classification, the size is often not sufficiently fine or small enough to produce the desired rapid crosslink times. Additionally, limited solubility borate solids exhibit a major change as the pH of the base guar solution is changed. For example, when the alkalinity is incrementally increased from a more acidic pH to a basic pH 10.0, the crosslink time is faster. At pH values greater than about pH 10.0, the crosslink time reverses and becomes slower as the alkalinity is increased. As a result, higher pH values (e.g., about 11.6) which are utilized to provide gel viscosity stability at elevated temperatures exhibit crosslink times greater than 12 minutes even with very fine borate solids. Accelerating crosslink times using finer particles with more surface area, or increased concentrations of sparingly-soluble borate is not feasible due to gelation of the crosslinking concentrate caused by more solids and their subsequent interaction.

In view of the above, the need exists for compositions, systems, and methods for providing more precise control of delays over the crosslinking reaction of borated aqueous subterranean treating fluids, such as fracturing fluids. The inventions disclosed and taught herein are directed to improved compositions and methods for the selective control of the rates of crosslinking reactions within aqueous subterranean treating fluids, especially at varying pH and over a wide range of formation temperatures, including formation temperatures greater than 200° F.

BRIEF SUMMARY OF THE INVENTION

The present disclosure provides novel compositions and systems for producing a controlled delayed crosslinking interaction in an aqueous solution as well as methods for the manufacture and use of such compositions, the compositions comprising a crosslinkable organic polymer and a crosslinking additive consisting of a sparingly-soluble borate crosslinking agent suspended in an aqueous crosslink modifier of fully-solubilized salts, acids, or alkali components which are capable of adjusting the rate at which gelation of the organic polymer occurs without substantially altering the final pH or other characteristics of the crosslinked system.

In accordance with a first embodiment of the present disclosure, compositions for controlling the gelation rate of an organic polymer-containing well treatment fluid are described, wherein the compositions comprise a crosslinkable organic polymer, a sparingly-soluble borate crosslinking agent; and a crosslink modifier composition capable of controlling the rate at which the crosslinking additive promotes the gelation of the crosslinkable organic polymer, wherein the crosslink modifier is a salt, an alkaline or acidic chemical, or a combination thereof. In accordance with further non-limiting aspects of this embodiment, the crosslink modifier is selected from the group consisting of $KCO_2H$, $KC_2H_3O_2$, $CH_3CO_2H$, $HCO_2H$, $KCO_2H$, $NaCO_2H$, $NaC_2H_3O_2$, $NaCO_2H$, and combinations thereof. In a further aspect of this embodiment, the composition may further comprise a chelating agent.

In a further embodiment of the present disclosure, well treatment fluid compositions are described comprising an aqueous solution consisting of a crosslinkable organic polymer, a crosslinking additive containing a sparingly-soluble borate crosslinking agent, and a crosslink modifier, wherein the crosslink modifier is capable of controlling the rate at which the sparingly-soluble borate promotes the gelation, or crosslinking, of the crosslinkable organic polymer at pH values greater than about 7. In accordance with this aspect of the present disclosure, the crosslink modifier is a salt, an alkaline chemical or acidic chemical, or a combination thereof.

In yet another embodiment of the present disclosure, methods of treating a subterranean formation are described, wherein the method generates a well treatment fluid comprising a blend of an aqueous solution and a crosslinkable organic polymer material that is at least partially soluble in the aqueous solution; hydrating the organic polymer in the aqueous solution; formulating a crosslinking additive comprising a borate-containing crosslinking agent and crosslink modifiers; adding the crosslinking additive to the hydrated treating fluid so as to crosslink the organic polymer in a controlled manner; and delivering the treating fluid into a subterranean formation.

In accordance with further embodiments of the present disclosure, compositions for controllably crosslinking aqueous well treatment solutions is described, wherein the compositions comprise a crosslinkable, viscosifying organic polymer; a sparingly-soluble borate crosslinking agent; and a crosslink modifier agent capable of controlling the rate at which the crosslinking agent promotes the gelation of the crosslinkable organic polymer at a pH greater than about 7, wherein the crosslink modifier agent is a salt, an acidic agent, or a basic agent, or combinations thereof. In further accordance with aspects of this embodiment, the crosslink modifier has a +1 or +2 valence state. In accordance with further aspects of this embodiment, the crosslink modifier is selected from the group consisting of $KCO_2H$, $KC_2H_3O_2$, $CH_3CO_2H$, $HCO_2H$, $KCO_2H$, $NaCO_2H$, $NaC_2H_3O_2$, $NaCO_2H$, and combinations thereof.

In accordance with further embodiments of the present disclosure, a fracturing fluid composition for use in a subterranean formation is described, wherein the fracturing fluid comprises an aqueous liquid, such as an aqueous brine; a crosslinkable viscosifying organic polymer; a sparingly-soluble borate crosslinking agent; and, a crosslinking modifier composition, wherein the crosslinking modifier composition is capable of controlling the rate at which sparingly-soluble borate crosslinking agent crosslinks the organic polymer at pH values greater than about 7. In accordance with aspects of this embodiment, the crosslink modifier is a salt, an alkaline chemical or acidic chemical, or a combination thereof. In further accordance with this embodiment, the composition may further comprise one or more chelating agents and/or friction reducers.

DETAILED DESCRIPTION

The written description of specific structures and functions set forth below are not presented to limit the scope of what the Applicants have invented or the scope of the appended claims. Rather, the written description is provided to teach any person skilled in the art to make and use the invention for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related and government-related factors, and other constraints, which may vary by specific implementation, location and time. While a developer's efforts might be complex and time-consuming in an absolute sense, such efforts would be, nevertheless, a routine undertaking for those of skill in this art and having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity and are not intended to limit the scope of the inventions or the appended claims.

Applicants have created compositions and related methods for the controlled crosslinking of crosslinkable organic polymers in well treatment fluids using sparingly-soluble, borate-containing water-base suspensions and crosslink modifier compositions, as well as the application of such compositions and methods to a number of hydrocarbon recovery operations.

In accordance with aspects of the present disclosure, well treatment fluid compositions and systems are described which are suitable for use in conjunction with the compositions and methods of these inventions, and which are useful to control the crosslinking rate of the fluids in a variety of subterranean environments, over a wide pH range. These well treatment fluid compositions, such as fracturing fluid compositions, comprise at least an aqueous base liquid, a crosslinkable organic polymer, a sparingly-soluble borate-containing crosslinking agent, and a crosslink modifier composition, wherein the crosslink modifier is capable of controlling the rate at which the sparingly-soluble borate-containing crosslinking additive promotes the gelation of the organic polymer at stabilized pH values greater than about 7.

In accordance with one embodiment of the present disclosure, the controlled crosslinking compositions and systems may be used in subterranean hydrocarbon recovery operations wherein the composition or system is contact with a subterranean formation in which the temperature ranges from about 150° F. (66° C.) to about 500° F. (260° C.), including formation temperature ranges from about 170° F. (77° C.) to about 450° F. (232° C.), and from about 200° F. (93° C.) to about 400° F. (204° C.), inclusive.

The typical crosslinkable organic polymers, sometimes referred to equivalently herein as "gelling agents", that may be included in the treatment fluids and systems described herein, particularly aqueous fluids and systems, and that may be used in connection with the presently disclosed inventions, typically comprise biopolymers, synthetic polymers, or a combination thereof, wherein the 'gelling agents' or crosslinkable organic polymers are at least slightly soluble in water (wherein slightly soluble means having a solubility of at least about 0.01 kg/m$^3$). Without limitation, these crosslinkable organic polymers may serve to increase the viscosity of the treatment fluid during application. A variety of gelling agents can be used in conjunction with the methods and compositions of the present inventions, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. The gelling agents may also be biopolymers comprising natural, modified and derivatized polysaccharides, and derivatives thereof that contain one or more of the monosaccharide units selected from the group consisting of galactose, mannose, glucoside, glucose, xylose, arabinose, fructose, glucuronic acid, or pyranosyl sulfate. Suitable gelling agents which may be used in accordance with the present disclosure include, but are not limited to, guar, hydroxypropyl guar (HPG), cellulose, carboxymethyl cellulose (CMC), carboxymethyl hydroxyethyl cellulose (CMHEC), hydroxyethylcellulose (HEC), carboxymethylhydroxypropyl guar (CMHPG), other derivatives of guar gum, xanthan, galactomannan gums and gums comprising galactomannans, cellulose, and other cellulose derivatives, derivatives thereof, and combinations thereof, such as various carboxyalkylcellulose ethers, such as carboxyethylcellulose; mixed ethers such as carboxyalkylethers; hydroxyalkylcelluloses such as hydroxypropylcellulose; alkylhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; combinations thereof, and the like. Preferably, in accordance with one non-limiting embodiment of the present disclosure, the gelling agent is guar, hydroxypropyl guar (HPG), or carboxymethylhydroxypropyl guar (CMHPG), alone or in combination.

Additional natural polymers suitable for use as crosslinkable organic polymers/gelling agents in accordance with the present disclosure include, but are not limited to, locust bean gum, tara (*Cesalpinia spinosa* lin) gum, konjac (*Amorphophallus konjac*) gum, starch, cellulose, karaya gum, xanthan gum, tragacanth gum, arabic gum, ghatti gum, tamarind gum, carrageenan and derivatives thereof. Additionally, synthetic polymers and copolymers that contain any of the above-mentioned functional groups may also be used. Examples of such synthetic polymers include, but are not limited to, polyacrylate, polymethacrylate, polyacrylamide, polyvinyl alcohol, maleic anhydride, methylvinyl ether copolymers, and polyvinylpyrrolidone.

Generally speaking, the amount of a gelling agent/crosslinkable organic polymer that may be included in a treatment fluid for use in conjunction with the present inventions depends on the viscosity desired. Thus, the amount to include will be an amount effective to achieve a desired viscosity effect. In certain exemplary embodiments of the present inventions, the gelling agent may be present in the treatment fluid in an amount in the range of from about 0.1% to about 60% by weight of the treatment fluid. In other exemplary embodiments, the gelling agent may be present in the range of from about 0.1% to about 20% by weight of the treatment fluid. In general, however, the amount of crosslinkable organic polymer included in the well treatment fluids described herein is not particularly critical so long as the viscosity of the fluid is sufficiently high to keep the proppant particles or other additives suspended therein during the fluid injecting step into the subterranean formation. Thus, depending on the specific application of the treatment fluid, the crosslinkable organic polymer may be added to the aqueous base fluid in concentrations ranging from about 15 to 60 pounds per thousand gallons (pptg) by volume of the total aqueous fluid (1.8 to 7.2 kg/m$^3$). In a further non-limiting range for the present inventions, the concentration may range from about 20 pptg (2.4 kg/m$^3$) to about 40 pptg (4.8 kg/m$^3$). In further, non-restrictive aspects of the present disclosure, the crosslinkable organic polymer/gelling agent present in the aqueous base fluid may range from about 25 pptg (about 3 kg/m$^3$) to about 40 pptg (about 4.8 kg/m$^3$) of total fluid. One skilled in the art, with the benefit of this disclosure, will recognize the appropriate gelling agent and amount of the gelling agent to use for a particular application. Preferably, in accordance with one aspect of the present disclosure, the fluid composition or well treatment system will contain from about 1.2 kg/m$^3$ (0.075 lb/ft$^3$) to about 12 kg/m$^3$ (0.75 lb/ft$^3$) of the gelling agent/crosslinkable organic polymer, most preferably from about 2.4 kg/m$^3$ (0.15 lb/ft$^3$) to about 7.2 kg/m$^3$ (0.45 lb/ft$^3$).

The crosslink modifier compositions useful in the treatment fluid formulations of the present disclosure comprise one or more crosslinking control additives, which are preferably selected from the group consisting of acidic agents, alkaline agents, salts, combinations of any of these agents (e.g., salts and alkaline agents), combinations of which may also serve as freeze-point depressants. Freeze point depressants themselves may also optionally be included in the crosslinking additive composition in accordance with the present disclosure, separately and distinct from the crosslink modifiers.

Acidic agents which may be used as crosslink modifiers in accordance with the present disclosure include inorganic and organic acids, as well as combinations thereof. Exemplary acidic agents suitable for use herein include acetic acid ($CH_3CO_2H$), boric acid ($H_3BO_3$), carbonic acid ($H_2CO_3$), hydrochloric acid (HCl), nitric acid ($HNO_3$), hydrochloric acid gas (HCl(g)), perchloric acid ($HClO_4$), hydrobromic acid (HBr), hydroiodic acid (HI), phosphoric acid ($H_3PO_4$), formic acid ($HCO_2H$), sulfuric acid ($H_2SO_4$), fluorosulfuric acid ($FSO_3H$), fluoroantimonic acid ($HFSbF_5$), p-toluene sulfonic acid (pTSA), trifluoroacetic acid (TFA), triflic acid ($CF_3SO_3H$), ethanesulfonic acid, methanesulfonic acid (MSA), malic acid, maleic acid, oxalic acid ($C_2H_2O_4$), salicylic acid, trifluoromethane sulfonic acid, citric acid, succinic acid, tartaric acid and heavy sulphate expressed by the general formula $XHSO_4$ (wherein X is an alkali metal, such as Li, Na, and K).

Alkaline agents which may be used as crosslink modifiers in accordance with the present disclosure include, but are not limited to, inorganic and organic alkaline agents (bases), as well as combinations thereof. Exemplary alkaline agents suitable for use herein include, but are not limited to, amines and nitrogen-containing heterocyclic compounds such as ammonia, methyl amine, pyridine, imidazole, histidine, and benzimidazole; hydroxides of alkali metals and alkaline earth metals, including, but not limited to, potassium hydroxide (KOH), sodium hydroxide (NaOH), barium hydroxide ($Ba(OH)_2$), cesium hydroxide (CsOH), strontium hydroxide ($Sr(OH)_2$), calcium hydroxide ($Ca(OH)_2$), lithium hydroxide (LiOH), and rubidium hydroxide (RbOH); oxides such as magnesium oxide (MgO), calcium oxide (CaO), and barium oxide; carbonates and bicarbonates of alkali metals, alkaline earth metals, and transition metals including sodium bicarbonate ($NaHCO_3$), sodium carbonate ($Na_2CO_3$), potassium carbonate ($K_2CO_3$), potassium bicarbonate ($KHCO_3$), lithium cabonate ($LiCO_3$), rubidium carbonate ($Rb_2CO_3$), cesium carbonate ($Cs_2CO_3$), beryllium carbonate ($BeCO_3$), magnesium carbonate ($MgCO_3$), calcium carbonate ($CaCO_3$), strontium carbonate ($SrCO_3$), barium carbonate ($BaCO_3$), manganese (II) carbonate ($MnCO_3$), iron (II) carbonate ($FeCO_3$), cobalt carbonate ($CoCO_3$), nickel (II) carbonate ($NiCO_3$), copper (II) carbonate ($CuCO_3$), zinc carbonate ($ZnCO_3$), silver carbonate ($Ag_2CO_3$), cadmium carbonate ($CdCO_3$), and lead carbonate ($Pb_2CO_3$); phosphate salts such as potassium dihydrogen phosphate ($KH_2PO_4$), di-potassium monohydrogen phosphate ($K_2HPO_4$) and tribasic potassium phosphate ($K_3PO_4$); acetates of alkali metals, alkaline earth metals, and transition metals, such as potassium acetate ($KC_2H_3O_2$), sodium acetate, lithium acetate, rubidium acetate, cesium acetate, beryllium acetate, magnesium acetate, calcium acetate, calcium-magnesium acetate, strontium acetate, barium acetate, aluminum acetate, manganese (III) acetate, iron (II) acetate, iron (III) acetate, cobalt acetate, nickel acetate, copper (II) acetate, chromium acetate, zinc acetate, silver acetate acetate, cadmium acetate, and lead (II) acetate; formates of alkali metals, alkaline earth metals, and transition metals, such as potassium formate ($KCO_2H$), sodium formate ($NaCO_2H$), and cesium formate ($CsCO_2H$); and alkoxides (conjugate bases of an alcohol), including, but not limited to, sodium alkoxide, potassium alkoxide, potassium tert-butoxide, titanium isopropoxide ($Ti(OCH(CH_3)_2)_4$), aluminum isopropoxide ($Al(O-i-Pr)_3$, where i-Pr is the isopropyl group ($CH(CH_3)_2$), and tetraethylorthosilicate (TEOS, $Si(OC_2H_5)_4$).

Salts which may be used as crosslink modifiers in accordance with the present disclosure include, but are not limited to, both inorganic salts such as alkali metal salts, alkaline earth metal salts, and transition metal salts such as halide salts like sodium chloride, potassium chloride, magnesium chloride, calcium chloride, and zinc chloride; as well as organic salts such as sodium citrate. The term "salt(s)", as used herein, denotes both acidic salts formed with inorganic and/or organic acids, as well as basic salts formed with inorganic and/or organic bases. Exemplary acid addition salts include acetates like potassium acetate, ascorbates, benzoates, benzenesulfonates, bisulfates, borates, butyrates, citrates, camphorates, camphorsulfonates, fumarates, hydrochlorides, hydrobromides, hydroiodides, lactates, maleates, methanesulfonates, naphthalenesulfonates, nitrates, oxalates, phosphates, propionates, salicylates, succinates, sulfates, tartarates, thiocyanates, toluenesulfonates (also known as tosylates,) and the like.

Exemplary basic salts include ammonium salts, alkali metal salts such as sodium, lithium, and potassium salts, alkaline earth metal salts such as calcium and magnesium salts, salts with organic bases (e.g., organic amines) such as dicyclohexylamines, t-butyl amines, and salts with amino acids such as arginine, lysine and the like. Basic nitrogen-containing groups of organic compounds may also be quarternized with agents such as lower alkyl halides (e.g., methyl, ethyl, and butyl chlorides, bromides and iodides), dialkyl sulfates (e.g., dimethyl, diethyl, and dibutyl sulfates), long chain halides (e.g., decyl, lauryl, and stearyl chlorides, bromides and, iodides), aralkyl halides (e.g., benzyl and phenethyl bromides), and others, so as to form basic organic salts.

As used herein, the term "alkali metal" refers to the series of elements comprising Group 1 of the Periodic Table of the Elements, and the term "alkaline earth metal" refers to the series of elements comprising Group 2 of the Periodic Table of the Elements, wherein Group 1 and Group 2 are the Periodic Table classifications according to the *International Union of Pure and Applied Chemistry*, (2002). The preferable crosslink modifiers suitable for use in the compositions described herein are alkali metal carbonates, alkali metal formates, alkali metal acetates, and alkali metal hydroxides. Typical crosslink modifiers include potassium carbonate, potassium formate, potassium acetate, potassium hydroxide, and combinations thereof. In accordance with one aspect of the present disclosure, the crosslink modifier is a monovalent salt, acidic agent, or alkaline agent that lowers the pour point of the aqueous composition, such as lithium, sodium, potassium, or cesium salts, acidic agents, or alkaline agents. In accordance with a further aspect of the present disclosure, the crosslink modifier is a divalent salt, acidic agent, or alkaline agent that lowers the pour point of the aqueous composition, such as calcium or magnesium salts, acidic agents or alkaline agents.

Freeze-point depressants which may be used as a crosslink modifier, in accordance with aspects of the present disclosure, include, but are not limited to, metal salts, including alkali metal, alkali earth metal, and transition metal salts of organic acids, linear sulphonate detergents, metal salts of caprylic acid, succinamic acid or salts thereof, N-laurylsarcosine metal salts, alkyl naphthalenes, polymethacrylates, such as Viscoplex® [Rohm RohMax] and LZ® 7749B, 7742, and 7748 [all from Lubrizol Corp.], vinyl acetate, vinyl fumarate, styrene/maleate co-polymers, and other freeze point depressants known in the art.

The amount of crosslink modifier present in the crosslinking additive compositions ranges from about 0.01 wt. % to about 80 wt. %, by weight of the total solution, and more preferably from about 0.1 wt. % to about 65 wt. %. The amount of crosslink modifier to be used may be determined based on the ratio of the crosslink modifier to the sparingly-soluble borate crosslinking agent, and ranges from about 1:1 to about 10:1, more preferably from about 1:1 to about 5:1, including ratios between these ranges, such as about 2:1, about 2.5:1, about 3:1, about 3.5:1, about 4:1, and about 4.5:1, inclusive.

The base fluid of the well treatment fluids that may be used in conjunction with the compositions and methods of these inventions preferably comprise an aqueous-based fluid, although they may optionally also further comprise an oil-based fluid, or an emulsion as appropriate. The base fluid may be from any source provided that it does not contain compounds that may adversely affect other components in the treatment fluid. The base fluid may comprise a fluid from a natural or synthetic source. In certain exemplary embodiments of the present inventions, an aqueous-based fluid may comprise fresh water or salt water depending upon the particular density of the composition required. The term "salt water" as used herein may include unsaturated salt water or saturated salt water "brine systems", such as a NaCl, or KCl brine, as well as heavy brines including $CaCl_2$, $CaBr_2$ and $KCO_2H$. The brine systems suitable for use herein may comprise from about 1% to about 75% by weight of an appropriate salt, including about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, and about 75 wt. % salt, without limitation, as well as concentrations falling between any two of these values, such as from about 21 wt. % to about 66 wt. % salt, inclusive. Generally speaking, the base fluid will be present in the well treatment fluid in an amount in the range of from about 2% to about 99.5% by weight. In other exemplary embodiments, the base fluid may be present in the well treatment fluid in an amount in the range of from about 70% to about 99% by weight. Depending upon the desired viscosity of the treatment fluid, more or less of the base fluid may be included, as appropriate. One of ordinary skill in the art, with the benefit of this disclosure, will recognize an appropriate base fluid and the appropriate amount to use for a chosen application.

In accordance with exemplary methods of the present disclosure, an aqueous fracturing fluid, as a non-limiting example, is first prepared by blending one or more crosslinkable organic polymers into an aqueous base fluid. The aqueous base fluid may be, for example, water, brine (e.g., a NaCl or KCl brine), aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

Any suitable mixing apparatus may be used for this procedure. In the case of batch mixing, the crosslinkable organic polymer, such as guar or a guar derivative, and the aqueous fluid are blended for a period of time sufficient to form a gelled or viscosified solution. The organic polymer that is useful in the present inventions is preferably any of the hydratable polysaccharides, as described herein above, and in particular those hydratable polysaccharides which are capable of gelling in the presence of a crosslinking agent to form a gelled base fluid. The most preferred hydratable polymers for the present inventions are guar gums, carboxymethyl hydroxypropyl guar and hydroxypropyl guar, as well as combinations thereof. In other embodiments of the present disclosure, the crosslinkable organic polymer, or gelling agent, may be depolymerized, as necessary. The term "depolymerized," as used herein, generally refers to a decrease in the molecular weight of the gelling agent. Depolymerized polymers are described in U.S. Pat. No. 6,488,091, the relevant disclosure of which is incorporated herein by reference as appropriate.

In addition to the aqueous base fluid and crosslinkable organic polymer, the treatment fluid comprises a crosslinking agent, which is used to crosslink the organic polymer and create a viscosified treatment fluid. While any crosslinking agent may be used, it is preferred that the crosslinking agent is a sparingly-soluble borate. For the purposes of the present disclosure, "sparingly-soluble" is defined as having a solubility in water at 22° C. (71.6° F.) of less than about 10 kg/m$^3$, as may be determined using procedures known in the arts such as those described by Güilensoy, et al. [M. T. A. Bull., no. 86, pp. 77-94 (1976); M.T.A. Bull., no. 87, pp. 36-47 (1978)]. For example, and without limitation, sparingly-soluble borates having a solubility in water at 22° C. (71.6° F.) ranging from about 0.1 kg/m$^3$ to about 10 kg/m$^3$ are appropriate for use in the compositions disclosed herein. Generally, in accordance with the present disclosure, the sparingly-soluble borate crosslinking agent may be any material that supplies and/or releases borate ions in solution. Exemplary sparingly-soluble borates suitable for use as crosslinkers in the compositions in accordance with the present disclosure include, but are not limited to, boric acid, alkali metal, alkali metal-alkaline earth metal borates, and the alkaline earth metal borates such as disodium octaborate tetrahydrate, sodium diborate, as well as boron containing minerals and ores. In accordance with certain aspects of the present disclosure, the concentration of the sparingly-soluble borate crosslinking agent described herein ranges from about from about 0.01 kg/m$^3$ to about 10 kg/m$^3$, preferably from about 0.1 kg/m$^3$ to about 5 kg/m$^3$, and more preferably from about 0.25 kg/m$^3$ to about 2.5 kg/m$^3$ in the well treatment fluid.

Boron-containing minerals suitable for use as sparingly-soluble borate crosslinking agent in accordance with the present disclosure are those ores containing 5 wt. % or more boron, including both naturally-occurring and synthetic boron-containing minerals and ores. Exemplary naturally-occurring, boron-containing minerals and ores suitable for use herein include but are not limited to boron oxide ($B_2O_3$), boric acid ($H_3BO_3$), borax ($Na_2B_4O_7 \cdot 10H_2O$), colemanite ($Ca_2B_6O_{11} \cdot 5H_2O$), frolovite $Ca_2B_4O_8 \cdot 7H_2O$, ginorite ($Ca_2B_{14}O_{23}$-$8H_2O$), gowerite ($CaB_6O_{10}$-$5H_2O$), howlite ($Ca_4B_{10}O_{23}Si_2$-$5H_2O$), hydroboracite ($CaMgB_6O_{11}$-$6H_2O$), inderborite ($CaMgB_6O_{11}$-$11H_2O$), inderite ($Mg_2B_6O_{11}$-$15H_2O$), inyoite ($Ca_2B_6O_{11}$-$13H_2O$), kaliborite (Heintzite) ($KMg_2B_{11}O_{19}$-$9H_2O$), kernite (rasorite) ($Na_2B_4O_7$-$4H_2O$), kumakovite ($MgB_3O_3(OH)_5$-$15H_2O$), meyerhofferite ($Ca_2B_6O_{11}$-$7H_2O$), nobleite ($CaB_6O_{10}$-$4H_2O$), pandermite ($Ca_4B_{10}O_{19}$-$7H_2O$), patemoite ($MgB_2O_{13}$-$4H_2O$), pinnoite ($MgB_2O_4$-$3H_2O$), priceite ($Ca_4B_{10}O_{19}$-$7H_2O$), preobrazhenskite ($Mg_3B_{10}O_{18}$-$4.5H_2O$), (probertite $NaCaB_5O_9$-$5H_2O$), tertschite ($Ca_4B_{10}O_{19}$-$20H_2O$), tincalconite ($Na_2B_4O_7$-$5H_2O$), tunellite ($SrB_6O_{10}$-$4H_2O$), ulexite ($Na_2Ca_2B_{10}O_{18}$-$16H_2O$), and veatchite $Sr_4B_{22}O_{37}$-$7H_2O$, as well as any of the Class V-26 Dana Classification borates, hydrated borates containing hydroxyl or halogen, as described and referenced in Gaines, R. V., et al. [*Dana's New Mineralogy*, John Wiley & Sons, Inc., NY, (1997)], or the class V/G, V/H, V/J or V/K borates according to the Strunz classification system [Hugo Strunz; Ernest Nickel: *Strunz Mineralogical Tables*, Ninth Edition, Stuttgart: Schweizerbart, (2001)]. Any of these may be hydrated and have variable amounts of water of hydration, including but not limited to tetrahydrades, hemihydrates, sesquihydrates, and pentahydrates. Further, in accordance with some aspects of the present disclosure, it is preferred that the sparingly-soluble borates be borates containing at least 3 boron atoms per molecule, such as, triborates, tetraborates, pentaborates, hexaborates, heptaborates, decaborates, and the like. In accordance with one aspect of the present disclosure, the preferred crosslinking agent is a sparingly-soluble borate selected from the group consisting of ulexite, colemanite, probertite, and mixtures thereof.

Synthetic sparingly-soluble borates which may be used as crosslinking agents in accordance with the presently disclosed well treatment fluids and associated methods include, but are not limited to, nobleite and gowerite, all of which may be prepared according to known procedures. For example, the production of synthetic colemanite, inyoite, gowerite, and meyerhofferite is described in U.S. Pat. No. 3,332,738, assigned to the U.S. Navy Department, in which sodium borate or boric acid are reacted with compounds such as $Ca(IO_3)_2$, $CaCl_2$, $Ca(C_2H_3O_2)_2$ for a period of from 1 to 8 days. The synthesis of ulexite from borax and $CaCl_2$ has also been reported [Gulensoy, H., et al., *Bull. Miner. Res. Explor. Inst. Turk.*, Vol. 86, pp. 75-78 (1976)]. Similarly, synthetic nobleite can be produced by the hydrothermal treatment of meyerhofferite ($2CaO_3B_2O_3$-$7H_2O$) in boric acid solution for 8 days at 85° C., as reported in U.S. Pat. No. 3,337,292. Nobleite may also be prepared in accordance with the processes of Erd, McAllister and Vlisidis [*American Mineralogist*, Vol. 46, pp. 560-571 (1961)], reporting the laboratory synthesis of nobleite by stirring CaO and boric acid in water for 30 hours at 48° C., followed by holding the product at 68° C. for 10 days. Other techniques which may be used to generate synthetic boron-containing materials suitable for use in the process of the present disclosure include hydrothermal techniques, such as described by Yu, Z.-T., et al. [*J. Chem. Soc., Dalton Transaction*, pp. 2031-2035 (2002)], as well as sol-gel techniques [see, for example, Komatsu, R., et al., *J. Jpn. Assoc. Cryst. Growth.*, Vol. 15, pp. 12-18 (1988)] and fusion techniques. However, while, synthetic sparingly-soluble borates may be used in the compositions and well treatment fluids described herein, naturally-occurring sparingly-soluble borates are preferred. This is due, in part, to the fact that although the synthetic compositions have the potential of being of higher purity than the naturally-occurring materials since they lack the mineral impurities found in naturally occurring specimens, they are generally relatively low in borate content by comparison.

The amount of borate ions in the treatment solution will often be dependent upon the pH of the solution. In one non-limiting embodiment of the present disclosure, the crosslinking agent is preferably one of the boron-containing ores selected from the group consisting of ulexite, colemanite, probertite, and mixtures thereof, present in the range from about 0.5 to in excess of about 45.0 pptg (pounds per thousand gallons) of the well treatment fluid. In another non-restrictive embodiment, the concentration of sparingly-soluble borate crosslinking agent is in the range from about 3.0 pptg to about 20.0 pptg of the well treatment fluid.

The compositions of the present disclosure may further contain a number of optionally-included additives, as appropriate or desired, such optional additives including, but not limited to, suspending agents/anti-settling agents, stabilizers, deflocculants, breakers, chelators/sequestriants, non-emulsifiers, fluid loss additives, biocides, proppants, buffering agents, weighting agents, wetting agents, lubricants, friction reducers, anti-oxidants, pH control agents, oxygen scavengers, surfactants, fines stabilizers, metal chelators, metal complexors, antioxidants, polymer stabilizers, clay stabilizers, freezing point depressants, scale inhibitors, scale dissolvers, shale stabilizing agents, corrosion inhibitors, wax inhibitors, wax dissolvers, asphaltene precipitation inhibitors, waterflow inhibitors, sand consolidation chemicals, leak-off control agents, permeability modifiers, micro-organisms, viscoelastic fluids, gases, foaming agents, and nutrients for micro-organisms and combinations thereof, such that none of the optionally-included additives adversely react or effect the other constituents of these inventions. Various breaking agents may also be used with the methods and compositions of the present disclosure in order to reduce or "break" the gel of the fluid, including but not necessarily limited to enzymes, oxidizers, polyols, aminocarboxylic acids, and the like, along with gel breaker aids. One of ordinary skill in the art will recognize the appropriate type of additive useful for a particular subterranean treatment operation. Further, all such optional additives may be included as needed, provided that they do not disrupt the structure, stability, mechanism of controlled delay, or subsequent degradability of the crosslinked gels at the end of their use.

In accordance with typical aspects of the present disclosure, the crosslinking agent (or agents, if appropriate) is maintained in a suspended manner in the crosslinking additive by the inclusion of one or more suspending agents in the crosslinking additive composition. The suspending agent typically acts to increase the viscosity of the fluid and prevent the settling-out of the crosslinking agent. Suspending agents may also minimize syneresis, the separation of the liquid medium so as to form a layer on top of the concentrated crosslinking additive upon aging. Suitable suspending agents for use in accordance with the present disclosure include both high-gravity and low-gravity solids, the latter of which may include both active solids, such as clays, polymers, and combinations thereof, and inactive solids. In a non-limiting aspect of the disclosure, the suspending agent may be any appropriate clay, including, but not limited to, palygorskite-type clays such as sepiolite, attapulgite, and combinations thereof, smectite clays such as hectorite, montmorillonite, kaolinite, saponite, bentonite, and combinations thereof, Fuller's earth, micas, such as muscovite and pholoogopite, as well as synthetic clays, such as laponite. The suspending agent may also be a water-soluble polymer which will hydrate in the treatment fluids described herein upon addition. Suitable water-soluble polymers which may be used in these treatment fluids include, but are not limited to, synthesized biopolymers, such as xanthan gum, cellulose derivatives, naturally-occurring polymers, and/or derivative of any of these water-soluble polymers, such as the gums derived from plant seeds. Various combinations of these suspending agents may be utilized in the crosslinking additive compositions of the present disclosure. Preferably, in accordance with certain aspects of the present disclosure, the suspending agent is a clay selected from the group consisting of attapulgite, sepiolite, montmorillonite, kaolinite, bentonite, and combinations thereof.

The amount of suspending agent which may be included in the crosslinking additive compositions described herein, when they are included, range in concentration from about 1 pound per 42 gallon barrel (bbl) to about 50 pounds per barrel (ppb), or more preferably from about 2 pounds per barrel to about 20 pounds per barrel, including about 3 ppb, about 4 ppb, about 5 ppb, about 6 ppb, about 7 ppb, about 8 ppb, about 9 ppb, about 10 ppb, about 11 ppb, about 12 ppb, about 13 ppb, about 14 ppb, about 15 ppb, about 16 ppb, about 17 ppb, about 18 ppb, about 19 ppb, and ranges between any two of these values, e.g., from about 2 ppb to about 12 ppb, inclusive. For purposes of the present disclosure, it is to be noted that one lbm/bbl is the equivalent of one pound of additive in 42 US gallons of liquid; the "m" is used to denote mass so as to avoid possible confusion with pounds force (denoted by "lbf"). Note that lbm/bbl may equivalently be written as PPB or ppb, but such notation as used herein is not to be confused with 'parts per billion'. In SI units, the conversion factor is one pound per barrel equals 2.85 kilograms per cubic meter; for example, 10 lbm/bbl=28.5 kg/m$^3$).

A deflocculant is a thinning agent used to reduce viscosity or prevent flocculation, sometimes (incorrectly) referred to as a "dispersant". Most deflocculants are low-molecular weight anionic polymers that neutralize positive charges on clay edges. Examples of deflocculants suitable for use in the compositions of the present disclosure include, but are not limited to, polyphosphates, lignosulfonates, quebracho (a powdered form of tannic acid extract from the bark of the quebracho tree, used as a high-pH and lime-mud deflocculant) and various water-soluble synthetic polymers.

The aqueous well treatment fluids of the present disclosure may optionally and advantageously comprise one or more friction reducers, in an amount ranging from about 10 wt. % to about 95 wt. % as appropriate. As used herein, the term "friction reducer" refers to chemical additives that act to reduce frictional losses due to friction between the aqueous treatment fluid in turbulent flow and tubular goods (e.g. pipes, coiled tubing, etc.) and/or the formation. Suitable friction reducing agents for use with the aqueous treatment fluid compositions of the present disclosure include but are not limited to water-soluble non-ionic compounds such as polyalkylene glycols and polyethylene oxide, and polymers and copolymers including but not limited to acrylamide and/or acrylamide copolymers, poly(dimethylaminomethyl acrylamide), polystyrene sulfonate sodium salt, and combinations thereof. In accordance with this aspect of the disclosure, the term "copolymer," as used herein, is not limited to polymers comprising two types of monomeric units, but is meant to include any combination of monomeric units, e.g., terpolymers, tetrapolymers, and the like.

In accordance with certain, non-limiting aspects of the present disclosure, the aqueous well-treatment fluids described herein may optionally include one or more chelating agents, in order to remedy instances which have the potential to detrimentally affect the controlled crosslinking of solutions as described herein, e.g., to remedy contaminated water situations. As used herein, the term 'chelating agent' refers to compounds containing one or more donor atoms that can combine by coordinate binding with a single metal ion to form a cyclic structure known equivalently as a chelating complex, or chelate, thereby inactivating the metal ions so that they cannot normally react with other elements or ions to produce precipitates or scale. Such chelates have the structural essentials of one or more coordinate bonds formed between a metal ion and two or more atoms in the molecule of the chelating agent, alternatively referred to as a 'ligand'. Suitable chelating agents for use herein may be monodentate, bidentate, tridentate, hexadentate, octadentate, and the like, without limitation. The amount of chelating agent used in the compositions described herein will depend upon the type and amount of ion or ions to be chelated or sequestered. Similarly, when chelating agents are included in the compositions of the present disclosure, it is preferable that the pH of the well treatment fluids described herein be kept above the pH at which the free acid of the chelating agent would precipitate; generally, this means keeping the pH of the composition above about 1, prior to delivering the treatment fluid downhole.

Exemplary chelating agents suitable for use with the compositions and well treating fluids of the present disclosure include, but are not limited to, acetic acid; acrylic polymers; aminopolycarboxylic acids and phosphonic acids and sodium, potassium and ammonium salts thereof; ascorbic acid; BayPure® CX 100 (tetrasodium iminodisuccinate, available from LANXESS Corporation, Pittsburgh, Pa.) and similar biodegradable chelating agents; carbonates, such as sodium and potassium carbonate; citric acid; dicarboxymethylglutamic acid; aminopolycarboxylic acid type chelating agents, including but not limited to cyclohexylenediamintetraacetic acid (CDTA), diethylenetriamine-pentaacetic acid (DTPA), ethylenediaminedisuccinic acid (EDDS); ethylenediaminetetraacetic acid (EDTA), hydroxyethylethylenediaminetriacetic acid (HEDTA), hydroxyethyliminodiacetic acid (HEIDA), nitrilotriacetic acid (NTA), and the sesquisodium salt of diethylene triamine penta (methylene phosphonic acid) (DTPMP.Na$_7$), or mixtures thereof, inulins (e.g. sodium carboxymethyl inulin); malic acid; nonpolar amino acids, such as methionine and the like; oxalic acid; phosphoric acids; phosphonates, in particular organic phosphonates such as sodium aminotrismethylenephosphonate; phosphonic acids and their salts, including but not limited to ATMP (aminotri-(methylenephosphonic acid)), HEDP (1-hydroxyethylidene-1,1-phosphonic acid), HDTMPA (hexamethylenediaminetetra-(methylenephosphonic acid)), DTPMPA (diethylenediaminepenta-(methylenephosphonic acid)), and 2-phosphonobutane-1,2,4-tricarboxylic acid, such as the commercially available DEQUEST™ phosphonates (Solutia, Inc., St. Louis, Mo.); phosphate esters; polyaminocarboxylic acids; polyacrylamines; polycarboxylic acids; polysulphonic acids; phosphate esters; inorganic phosphates; polyacrylic acids; phytic acid and derivatives thereof (especially carboxylic derivatives); polyaspartates; polyacrylades; polar amino acids (both alph- and beta-form), including but not limited to arginine, asparagine, aspartic acid, glutamic acid, glutamine, lysine, and ornithine; siderophores, including but not limited to the desferrioxamine siderophores Desferrioxamine B (DFB, a specific iron complexing agent originally obtained from an iron-bearing metabolite of Actinomycetes (*Streptomyces pilosus*), and the cyclic trihydroxamate produced by *P. stutzeri*, Desferrioxamine E (DFE)); succinic acid; trihydroxamic acid and derivatives thereof, as well as combinations of the above-listed chelating agents, and the free acids of such chelating agents (as appropriate) and their water-soluble salts (e.g., their $Na^+$, $K^+$, $NH_4^+$, and $Ca^{2+}$ salts).

Non-limiting exemplary chelating agent/metal complexes which may be formed by the chelating agents of the present disclosure with suitable metal ions include chelates of the salts of barium (II), calcium (II), strontium (II), magnesium (II), chromium (II), titanium (IV), aluminum (III), iron (II), iron (III), zinc (II), nickel (II), tin (II), or tin (IV) as the metal and nitrilotriacetic acid, 1,2-cylohexane-diamine-N,N,N',N'-tetra-acetic acid, diethylenetriamine-pentaacetic acid, ethylenedioxy-bis(ethylene-nitrilo)-tetraacetic acid, N-(2-hydroxyethyl)-ethylenediamino-N,N',N'-triacetic acid, triethylene-tetraamine-hexaacetic acid or N-(hydroxyethyl)ethylenediamine-triacetic acid or a mixture thereof as a ligand.

The well treatment fluid of the present disclosure may also optionally comprise proppants for use in subterranean applications, such as hydraulic fracturing. Suitable proppants include, but are not limited to, gravel, natural sand, quartz sand, particulate garnet, glass, ground walnut hulls, nylon pellets, aluminum pellets, bauxite, ceramics, polymeric materials, combinations thereof, and the like, all of which may further optionally be coated with resins, tackifiers, surface modification agents, or combinations thereof. If used, these coatings should not undesirably interact with the proppant particulates or any other components of the treatment fluids of the present inventions. One having ordinary skill in the art, with the benefit of this disclosure, will recognize the appropriate type, size, and amount of proppant particulates to use in conjunction with the well treatment fluids of the present disclosure, so as to achieve a desired result. In certain non-limiting embodiments, the proppant particulates used may be included in a well treatment fluid of the present inventions to form a gravel pack downhole or as a proppant in fracturing operations.

The treatment fluids of the present inventions may optionally further comprise one or more pH buffers, as necessary, and depending upon the characteristics of the subterranean formation to be treated. The pH buffer is typically included in the treatment fluids of the present inventions to maintain pH in a desired range, inter alia, to enhance the stability of the treatment fluid. Examples of suitable pH buffers include, but are not limited to, alkaline buffers, acidic buffers, and neutral buffers, as appropriate. Alkaline buffers may include those comprising, without limitation, ammonium, potassium and sodium carbonates, bicarbonates, sesquicarbonates, and hydrogen phosphates, in an amount sufficient to provide a pH in the treatment fluid greater than about pH 7, and more preferably from about pH 9 to about pH 12. Further exemplary alkaline pH buffers include sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, or combinations thereof, and the like. Advantageously, the present inventions do not modify the pH, allowing the pH of the treatment fluid to remain at a desired level.

Acidic buffers may also be used with the formulation of treatment fluids in accordance with the present disclosure. An acidic buffer solution is one which has a pH less than 7. Acidic buffer solutions may be made from a weak acid and one of its salts, such as a sodium salt, or may be obtained from a commercial source. An example would be a mixture of ethanoic acid and sodium ethanoate in solution. In this case, if the solution contained equal molar concentrations of both the acid and the salt, it would have a pH of 4.76. Thus, as used herein, "acidic buffer" means a compound or compounds that, when added to an aqueous solution, reduces the pH and causes the resulting solution to resist an increase in pH when the solution is mixed with solutions of higher pH. The acidic buffer must have a pKa below about 7. Some currently preferred ranges of pKa of the acidic buffer are below about 7, below about 6, below about 5, below about 4 and below about 3. Acidic buffers with all individual values and ranges of pKa below about 7 are included in the present disclosure. Examples of acidic buffers suitable for use with the treatment fluids described herein include, but are not limited to, phosphate, citrate, iso-citrate, acetate, succinate, ascorbic, formic, lactic, sulfuric, hydrochloric, nitric, benzoic, boric, butyric, capric, caprilic, carbonic, carboxylic, oxalic, pyruvic, phthalic, adipic, citramalic, fumaric, glycolic, tartaric, isotartaric, lauric, maleic, isomalic, malonic, orotic, propionic, methylpropionic, polyacrylic, succinic, salicylic, 5-sulfosalicylic, valeric, isovaleric, uric, and combinations thereof, such as a combination of phosphoric acid and one or more sugars that has a pH between about 1 and about 3, as well as other suitable acids and bases, as known in the art and described in the *Kirk-Othmer Encyclopedia of Chemical Technology,* $5^{th}$ Edition, John Wiley & Sons, Inc., (2008). Other suitable acidic buffers are mixtures of an acid and one or more salts. For example, an acidic buffer suitable for use herein may be prepared using potassium chloride or potassium hydrogen phthalate in combination with hydrochloric acid in appropriate concentrations.

Oxygen scavengers may also be included in the aqueous well treatment fluids of the present disclosure. As used herein, the term 'oxygen scavenger' refers to those chemical agents that react with dissolved oxygen (O2) in the solution compositions in order to reduce corrosion resulting from, or exacerbated by, dissolved oxygen (such as by sulfite and/or bisulfite ions combining with oxygen to form sulfate). Oxygen scavengers typically work by capturing or complexing the dissolved oxygen in a fluid to be circulated in a wellbore in a harmless chemical reaction that renders the oxygen unavailable for corrosive reactions. Exemplary oxygen scavengers suitable for use herein include, but are not limited to, metal-containing agents such as organotin compounds, nickel compounds, copper compounds, cobalt compounds, and the like; hydrazines; ascorbic acids; sulfates, such as sodium thiosulfate pentahydrate; sulfites such as potassium bisulfite, potassium meta-bisulfite, and sodium sulfite; and combinations of two or more of such oxygen scavengers, as appropriate, and depending upon the particular characteristics of the subterranean formation to be treated with a treatment fluid of the present disclosure. In order to improve the solubility of oxygen scavengers, such as stannous chloride or other suitable agents, so that they may be readily combined with the compositions of the present disclosure on the fly, the oxygen scavenger(s) may be pre-dissolved in an appropriate aqueous solution, e.g., when stannous chloride is used as an oxygen scavenger, it may be dissolved in a dilute, aqueous acid (e.g., hydrochloric acid) solution in an appropriate weight (e.g., from about 0.1 wt. % to about 20 wt. %), prior to introduction into the well treatment fluids described herein.

Other common additives which may be employed in the well treatment fluids described herein include gel stabilizers that stabilize the crosslinked organic polymer (typically a polysaccharide crosslinked with a borate) for a sufficient period of time so that the fluid may be pumped to the target subterranean formation. Suitable crosslinked gel stabilizers which may be used in the treatment fluids described herein include, but are not necessarily limited to, sodium thiosulfate, diethanolamine, triethanolamine, methanol, hydroxyethylglycine, tetraethylenepentamine, ethylenediamine and mixtures thereof.

The compositions of the present disclosure may also comprise one or more breakers, added at the appropriate time during the treatment of a subterranean formation that is penetrated by a wellbore. Typically, once a proppant has been placed in a subterranean fracture following a fracturing operation, the crosslinked support fluid for the proppant (such as those described herein) must be thinned, and the high-molecular weight filter cake on the fracture faces must be destroyed in order to facilitate clean-up prior to producing from the formation. This is commonly accomplished through the use of "breakers"—chemicals that literally 'break' the crosslinked polymer molecules into smaller pieces of lower molecular weight enabling a viscous fluid (such as a fracturing fluid) to be degraded controllably to a thin fluid that can be produced back out of the formation [see, for example, Ely, J. W., Fracturing Fluids and Additives, in *Recent Advances in Hydraulic Fracturing*, Society of Petroleum Engineers, Inc.; Gidley, J. L., et al., Eds., Ch. 7, pp. 131-146 (1989); and Rae, P., and DiLullo, G., *SPE* Paper No. 37359 (1996).]. In accordance with this disclosure, the breaker(s) which are suitable for use in the presently described compositions and associated treatment methods for subterranean formations may be either an organic or inorganic peroxide, both of which may be either soluble in water or only slightly soluble in water. As used in this disclosure, the term "organic peroxide" refers to both organic peroxides (those compounds containing an oxygen-oxygen (—O—O—) linkage or bond (peroxy group)) and organic hydroperoxides, while the term "inorganic peroxide" refers to those inorganic compounds containing an element at its highest state of oxidation (such as perchloric acid, $HClO_4$), or containing the peroxy group (—O—O—). The term "slightly water soluble" as used herein with reference to breakers refers to the solubility of either an organic peroxide or an inorganic peroxide in water of about 1 gram/100 grams of water or less at room temperature and pressure. Preferably, the solubility is about 0.10 gram or less of peroxide per 100 grams of water. The solubility determination of peroxides for use as breakers in accordance with the present disclosure may be measured by any appropriate method including, but not limited to, HPLC methods, voltammetric methods, and titration methods such as the iodometric titrations described in *Vogel's Textbook of Quantitative Chemical Analysis*, $6^{th}$ Ed., Prentice Hall, (2000).

In accordance with this aspect of the present disclosure, processes are described for delivering a well treatment fluid (such as a fracturing fluid) comprising a polysaccharide, a sparingly-soluble borate crosslinking agent, and a crosslink modifier into a subterranean formation that is penetrated by a wellbore, contacting the borate-stabilized crosslinked fluid with an organic or inorganic breaker which is soluble or only slightly-soluble, wherein the breaker is present in an amount sufficient to reduce the viscosity. In accordance with such processes, either individual batches of the crosslinked fluids may be periodically treated with the organic or inorganic breaker so that the breaker is provided intermittently to the well, or alternatively and equally acceptable, all of the crosslinked fluid used in a given operation may be treated so that the breaker in effect is continuously provided to the well.

The organic peroxides suitable for use as breakers in accordance with the present disclosure may have large activation energies for peroxy radical formation and relatively high storage temperatures that usually exceed about 80° F. High activation energies and storage temperatures of the organic peroxides suitable for use with the compositions herein lend stability to the compositions, which can in turn provide a practical shelf life. Preferred organic peroxides suitable for use as breakers include, but are not limited to, cumene hydroperoxide, t-butyl hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, mixtures thereof, and mixtures of organic peroxides with one or more additional agents, such as potassium persulfate, nitrogen ligands (e.g., EDTA or 1,10-phenatroline). For example, cumene hydroperoxide has a slight water solubility of about 0.07 gram/100 grams water, an activation energy of about 121 kJ/mole in toluene, and a half life of about 10 hours at 318° F.

Slightly water-soluble inorganic and organic peroxides are preferred for use in applications where they may have better retention in the fracture during injection than water-soluble inorganic or organic peroxides. While not limiting the reason for this to a single theory, such retainment may likely be due to the polysaccharide filter cake itself. The cake, when exposed to a pressure differential during pumping into the subterranean formation, allows the water phase to filter through the cake thickness. After passing through the filter cake, the water, and any associated water-soluble solutes, can enter into the formation matrix. Consequently, water-soluble peroxides can behave in a manner similar to persulfates with a sizeable fraction degrading in the formation matrix. In contrast, most of the slightly water-soluble inorganic and organic peroxides suggested for use herein are not in the water phase and consequently do not filter through the polysaccharide filter cake into the formation. Most of the inorganic and organic peroxides described herein as being suitable for use with the fluids of the present disclosure can become trapped within the cake matrix. Therefore, the inorganic or organic peroxide concentration should increase within the fracture at nearly the same rate as the polysaccharide while retaining amounts sufficient to degrade both the fluid and the filter cake.

The rate of the slightly water-soluble inorganic or organic peroxide degradation will depend on both temperature and the concentration of the inorganic or organic peroxide. The amount of slightly water-soluble organic peroxide used is an amount sufficient to decrease viscosity or break a gel without a premature reduction of viscosity. For example, if the average gelled polysaccharide polymer has a molecular weight of about two million, and the desired molecular weight reduction is about 200,000 or less, then the reduction would entail about ten cuts. A concentration of 20 ppm of organic peroxide should degrade the polysaccharide without a premature reduction of viscosity. Preferably, the amount of organic peroxide ranges from about 5 ppm to about 15,000 ppm based on the fluid. Typically, the concentration depends on both polysaccharide content, preferably about 0.24% to about 0.72% (weight/volume) and the temperature. The applicable temperature range suitable for use with these peroxides ranges from about 125° F. to about 275° F., while the applicable pH can range from about pH 3 to about pH 11. Additionally, the average particle size of the peroxide breaker may range from about 20 mesh to about 200 mesh, and more preferably from about 60 mesh to about 180 mesh.

Inorganic peroxides suitable for use as breakers in a combination with the compositions of the present disclosure include, but are not limited to, alkali metal peroxides, alkaline earth metal peroxides, transition metal peroxides, and combinations thereof, such as those described by Skiner, N. and Eul, W., in *Kirk-Othmer Encyclopedia of Chemical Technology*, J. Wiley & Sons, Inc., (2001). Exemplary alkali metal peroxides suitable for use in association with the present disclosure include, but are not limited to, sodium peroxide, sodium hypochlorite, potassium peroxide, potassium persulfate, potassium superoxide, lithium peroxide, and mixtures of such peroxides such as sodium/potassium peroxide. Exemplary alkaline earth metal peroxides include magnesium peroxide, calcium peroxide, strontium peroxide, and barium peroxide, as well as mixed peroxides such as calcium/magnesium peroxide. Transition metal peroxides which may be used in the compositions described herein include any peroxide comprising a metal from Group 4 to Group 12 of the Periodic Table of the Elements, such as zinc peroxide.

Additional common additives which may be used in conjunction with the presently described well treatment fluids are enzyme breaker (protein) stabilizers. These compounds may act to stabilize any enzymes and/or proteins used in the treating fluids to eventually 'break' the gel after the subterranean formation is treated, so that they are still effective at the time it is desired to break the gel. If the enzymes degrade too early, they will not be available to effectively break the gel at the appropriate time. Nonlimiting examples of enzyme breaker stabilizers which may be incorporated into the well treatment fluids of the present disclosure include sorbitol, mannitol, glycerol, citrates, aminocarboxylic acids and their salts (EDTA, DTPA, NTA, etc.), phosphonates, sulphonates and mixtures thereof.

The delayed crosslinking additives and treatment fluids of the present disclosure may be used in any subterranean treating operation wherein such a treatment fluid would be appropriate, such as a stimulation or completion operation, and where the viscosity and crosslinking of that treatment fluid will be advantageously controlled or modified. Exemplary types of treating subterranean formations include, without limitation, drilling a well bore, completing a well, stimulating a subterranean formation with treatment operations such as fracturing (including hydraulic and foam fracturing) and/or acidizing (including matrix acidizing processes and acid fracturing processes), diverting operations, water control operations, and sand control operations (such as gravel packing processes), as well as numerous other subterranean treating operations, preferably those associated with hydrocarbon recovery operations. As used herein, the term "treatment," or "treating," refers to any subterranean operation that uses a fluid in conjunction with a desired function and/or for a desired purpose. The term "treatment," or "treating," does not imply any particular action by the fluids of the present disclosure.

Other and further embodiments utilizing one or more aspects of the inventions described above can be devised without departing from the spirit of the Applicants' inventions. Further, the various methods and embodiments of the well treatment fluids and application methods described herein can be included in combination with each other to produce variations of the disclosed methods and embodiments. Discussion of singular elements can include plural elements and vice-versa.

The following examples are included to demonstrate preferred embodiments of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

EXAMPLES

Example 1

General Crosslinking Evaluation Procedure

The degree of crosslinking of several of the boron-containing ores was determined using standard methods, as described, for example, in U.S. Pat. No. 7,018,956. In general, to conduct the crosslinking tests, a 2% KCl-guar solution was prepared by dissolving 5 grams of potassium chloride (KCl) in 250 mL of distilled or tap water, followed by adding 0.7 grams of guar polymer, such as WG-35™ (available from Halliburton Energy Services, Inc., Duncan, Okla.), or the equivalent. The resulting mixture was agitated using an overhead mixer for 30 to 60 minutes, to allow hydration. Once the guar had completely hydrated, the pH of the solution was determined with a standard pH probe, and the temperature was recorded. Typically, the initial guar mixture had a pH that was in the range from about 7.5 to about 8.0, and had an initial viscosity (as determined on a FANN® Model 35A viscometer, available from the Fann Instrument Company, Houston, Tex.) ranging from about 16 cP to about 18 cP at 77° F. A volume of 250 mL of the guar solution was placed in a clean, dry glass Waring blender jar and the mixing speed of the blender motor was adjusted using a rheostat (e.g., a Variac voltage controller) to form a vortex in the guar solution so that the acorn nut (the blender blade bolt) and a small area of the blade, that surrounds the acorn nut in the bottom of the blender jar was fully exposed, yet not so high as to entrain significant amounts of air in the guar solution. While maintaining mixing at this speed, 0.44 mL of crosslinking additive solution containing sparingly-soluble borate was added to the guar mixture to effect crosslinking. Upon addition of the entire boron-containing material sample to the guar solution, a timer was simultaneously started. The crosslinking rate is expressed by three different time recordings: vortex closure, $T_1$, static top, $T_2$, and hang lip time, $T_3$. $T_1$ is defined herein as the time that has elapsed between the time that the crosslinker/boron-containing material is added and the time when the acorn nut in the blender jar just becomes fully covered by fluid. $T_2$ is defined as the time that has elapsed between the time that the crosslinker/boron-containing material is added and the time when the top surface of the fluid in the blender jar has stopped rolling/moving and becomes substantially static. These two measurements are indicated in the tables herein as VC (for "vortex closure") and ST (for "static top"), respectively. The blender mixing speed setting remained constant throughout this test (although the actual mixing speed may be reduced as the viscosity of the crosslinked fluid increases). Optionally, after $T_2$ was recorded, the mixing was stopped and the fluid was manually agitated back and forth between two beakers to observe the consistency of the crosslinked composition. This optional third measurement ($T_3$), referred to generally as the hang lip time, is defined herein as the time that has elapsed between the time that the crosslinker is added and the time when the crosslinked fluid forms a stiff lip that can hang on the edge of the beaker. Those of ordinary skill in the art of evaluating fracturing fluids will quickly recognize the fundamental tenants of evaluating such fluids in the manner described in these Examples, although individual testing practices and procedures may vary from those described herein.

Example 2

Comparison of Water-Base and Oil-Base Crosslink Times

The initial crosslinking concentrates were prepared in both water and diesel, according to known, general procedures. In particular, the water-based concentrate was prepared by mixing together 2 grams of attapulgite clay (FLORIGEL® HY, available from the Floridan Company, Quincy, Fla.), 0.857 grams of low viscosity polyanionic cellulose (GABROIL® LV, available from Akzo Nobel, The Netherlands), 0.857 mL of NALCO® 9762 viscosity modifier/deflocculant (available from the Nalco Company, Sugarland, Tex.), and 49.97 grams of ground ($D_{50}$=11 or 36) ulexite from the Bigadiç region of Turkey in 72.82 mL of Houston, Tex. tap water. The diesel-based concentrate was prepared by mixing together 2.14 grams of a suspending agent, such as CLAYTONE® AF or TIXOGEL® MP-100 (both available from Southern Clay Products, Inc., Gonzales, Tex.), 1.31 mL of an emulsifier such as Witco 605A (available from the Chemtura Corp., Middlebury, Conn.), and 49.97 grams of ground ($D_{50}$≈11 or 36) ulexite from the Bigadiç region of Turkey in 72.36 mL of diesel.

A 2% KCl-guar mixture for use with both the water-based and diesel-based concentrates was prepared as a model of typical well treatment fluids, and comprised a mixture of 5 grams of KCl and 0.7 grams of guar gum (WG-35™, available from Halliburton Energy Services, Inc., Duncan, Okla.) in 250 mL of Houston, Tex. tap water. The pH of the resultant guar mixture was then adjusted to 7 pH with dilute acetic acid ($CH_3CO_2H$). A concentration of 0.44 mL of either water-base or oil-base solutions with suspended sparingly-soluble borate was admixed with 250 mL of a guar solution and the crosslinking time determined at 100° F. (37.78° C.). The results of these comparisons are shown in Table A.

Table A demonstrates that particle size distributions with a high percentage of fines suspended in a saturated borate mineral water have little impact on crosslink times when mixed in a low pH guar composition. Varying the D-50 particle size of the borate from 11 to 36 microns only changes the crosslink time by 3-5%, whereas the same solids mixed in an oil-base concentrate alters the crosslink time by 22%.

Example 3

Crosslink Time Comparison for Potassium Acetate/Potassium Carbonate Crosslinking Additives A series of crosslinking additive compositions comprising varying amounts of the crosslink modifiers potassium acetate ($KC_2H_3O_2$) and potassium carbonate ($K_2CO_3$) were prepared and their crosslink times evaluated. In general, a 2% KCl-guar mixture, as described above, was prepared. Separately, 100 mL of crosslinking additive solution was prepared having the ratio of an aqueous $KC_2H_3O_2$ solution-to-$K_2CO_3$ recited in Tables B-E, below. For example, in the preparation of a 93.76 vol. % $KC_2H_3O_2$/6.24 vol. % $K_2CO_3$ crosslink modifier solution (Table B), 68.29 mL of a 10.22 lb. gal. potassium acetate solution (available from NA-CHURS/ALPINE Solutions, Marion, Ohio) was added to 4.54 mL of an 11.75 lb. gal. solution of potassium carbonate (available from NA-CHURS/ALPINE Solutions, Marion, Ohio) and the mixture was stirred to effect a completely mixed solution. To this $KC_2H_3O_2/K_2CO_3$ solution was added 2 grams of attapulgite clay (FLORIGEL® HY, available from the Floridan Company, Quincy, Fla.), and the solution mixed in a Hamilton Beach mixer for approximately 15 minutes. Subsequently, 0.857 grams of low viscosity polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of finely ground ($D_{50}$≈36) ulexite from the Bigadiç region of Turkey, completing the crosslinking additive composition. A concentration of 0.44 mL of $KC_2H_3O_2/K_2CO_3$ crosslinking additive with suspended sparingly-soluble borate was then admixed with 250 mL of a guar solution and the crosslinking time determined at 100° F. (37.78° C.). The results of these comparisons are shown in Tables B, C, D and E, below.

TABLES B-E: Crosslink time comparisons for potassium acetate/potassium carbonate crosslinking additives (guar pH 7, borate particles D-50 of 36 microns).

TABLE A

Crosslink time comparisons for water-base and oil-base crosslinking additives.

| Additive Base Solution | Additive pH | Grind D-50 | Guar pH Acetic | VC M:S[1] | % Change[2] | ST M:S | % Change | Final pH |
|---|---|---|---|---|---|---|---|---|
| Water | 8.97 | 11 | 7 | 2:39 | — | 3:02 | — | 8.93 |
| Water | 8.98 | 36 | 7 | 2:46 | −4.4 | 3:09 | −3.8 | 8.93 |
| Diesel | — | 11 | 7 | 3:19 | — | 3:39 | — | 8.90 |
| Diesel | — | 36 | 7 | 4:04 | −22.6 | 4:29 | −22.8 | 8.90 |

As used in the tables herein:
[1] The letter "M" designates minutes, and the letter "S" designates seconds, such that the value "2:39" means two minutes and thirty-nine seconds.
[2] The plus (+) sign designates faster times and the negative (−) sign designates slower times for crosslinks.

$KC_2H_3O_2/K_2CO_3$

| Crosslink Modifier Concentration Lb./Gal.[1] | Crosslink Modifier Solution Vol. %[2] | Crosslinking Additive Wt. %[3] | Crosslinking Additive pH | VC M:S | % Change | ST M:S | % Change | Final pH | % Change[4] |
|---|---|---|---|---|---|---|---|---|---|
| TABLE B | | | | | | | | | |
| 10.22/0 | 100/0 | 62.29/0 | 10.65 | 0:58 | — | 1:13 | — | 8.91 | — |
| 10.22/11.75 | 99.37/0.63 | 61.84/0.47 | 10.70 | 1:18 | −34.5 | 1:38 | −34.2 | 8.94 | — |
| 10.22/11.75 | 97.49/2.51 | 60.58/1.87 | 10.99 | 1:04 | +17.9 | 1:20 | +18.4 | 8.95 | — |
| 10.22/11.75 | 93.76/6.24 | 58.00/4.44 | 11.41 | 0:50 | +21.9 | 1:01 | +23.8 | 9.07 | — |
| 10.22/11.75 | 87.49/12.51 | 53.91/8.82 | 11.67 | 0:35 | +30.0 | 0:42 | +31.1 | 9.14 | — |
| TABLE C | | | | | | | | | |
| Water | Water | Water | 8.98 | 2:46 | — | 3:09 | — | 8.93 | — |
| 10.22/11.75 | 97.49/2.51 | 60.58/1.87 | 10.99 | 1:04 | +61.4 | 1:20 | +57.7 | 8.95 | +0.2 |
| 8.90/0 | 100/0 | 58.78/0 | 9.36 | 1:03 | +62.0 | 1:18 | +58.7 | 8.93 | 0 |
| 10.22/0 | 100/0 | 62.29/0 | 10.65 | 0:58 | +65.1 | 1:13 | +61.4 | 8.91 | −0.2 |
| 8.90/11.75 | 97.49/2.51 | 57.04/2.04 | 9.91 | 0:55 | +66.9 | 1:06 | +65.1 | 8.94 | +0.1 |
| TABLE D | | | | | | | | | |
| 8.90/0 | 100/0 | 58.78/0 | 9.36 | 1:03 | — | 1:18 | — | 8.93 | — |
| 10.22/0 | 100/0 | 62.29/0 | 10.65 | 0:58 | +7.9 | 1:13 | +6.4 | 8.91 | — |
| 8.90/11.75 | 97.49/2.51 | 57.04/2.04 | 9.91 | 0:55 | — | 1:06 | — | 8.94 | — |
| 10.22/11.75 | 97.49/2.51 | 60.58/1.87 | 10.99 | 1:04 | −16.4 | 1:20 | −21.2 | 8.95 | — |
| TABLE E | | | | | | | | | |
| 8.90/0 | 100/0 | 58.78/0 | 9.36 | 1:03 | — | 1:18 | — | 8.93 | — |
| 8.90/11.75 | 97.49/2.51 | 57.04/2.04 | 9.91 | 0:55 | +12.7 | 1:06 | +15.4 | 8.94 | — |
| 10.22/0 | 100/0 | 62.29/0 | 10.65 | 0:58 | — | 1:13 | — | 8.91 | — |
| 10.22/11.75 | 97.49/2.51 | 57.04/2.04 | 10.99 | 1:04 | −10.3 | 1:20 | −9.6 | 8.95 | — |

As used in the tables herein:
[1] Concentration of $KC_2H_3O_2$ and $K_2CO_3$ in the crosslink modifier solution, such that "10.22/11.75" means a solution of 10.22 lb./gal. $KC_2H_3O_2$ and 11.75 lb./gal. $K_2CO_3$.
[2] Ratio of aqueous 8.90 or 10.22 lb./gal. $KC_2H_3O_2$ and 11.75 lb./gal. $K_2CO_3$ solutions contained in the crosslink modifier, such that "99.37/0.63" means 99.37 vol. % $KC_2H_3O_2$ and 0.63 vol % $K_2CO_3$.
[3] Percentage by weight of 8.90 or 10.22 lb./gal. $KC_2H_3O_2$ and 11.75 lb./gal. $K_2CO_3$ crosslink modifier solutions in the crosslinking additive composition, such that "61.84/0.47" means 61.84 wt. % $KC_2H_3O_2$ and 0.47 wt. % $K_2CO_3$.
[4] The plus (+) sign designates increased values and the negative (−) sign designates reduced values for pH.

Example 4

Crosslink Time Comparison for Potassium Formate/Potassium Carbonate Crosslinking Additives A series of crosslinking additive compositions comprising varying amounts of the crosslink modifiers potassium formate ($KCO_2H$) and potassium carbonate ($K_2CO_3$) were prepared and their crosslink times evaluated. In general, a 2% KCl-guar mixture having a pH of 7, as described above, was prepared. Separately, 100 ml of crosslinking additive solution was prepared having the ratio of an aqueous $KCO_2H$ solution to $K_2CO_3$ solution recited in Tables F-I, below. For example, in the preparation of the mixture at entry 2 of Table F, 67.31 mL of 11.22 lb. gal. potassium formate ($KCO_2H$, available from NA-CHURS/APLINE Solutions, Marion, Ohio) was stirred with 5.06 mL of Houston, Tex. tap water generating an 11.0 lb. gal. mixture. Added to this was 0.457 mL of an 11.75 lb. gal. solution of potassium carbonate ($K_2CO_3$, available from NA-CHURS/ALPINE Solutions, Marion, Ohio) and the mixture was stirred to effect a completely mixed solution. To this $KCO_2H/K_2CO_3$ solution was added 2 grams of attapulgite clay (FLORIGEL® HY, available from the Floridan Company, Quincy, Fla.), and the solution was mixed with a Hamilton Beach mixer for approximately 15 minutes. Subsequently, 0.857 grams of low viscosity polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of finely ground ($D_{50}$≈36) ulexite from the Bigadiç region of Turkey. The pH of the resultant crosslinking additive mixture was 10.71. The pH of the guar solution, such as described above, was adjusted to pH 7 with dilute formic acid ($HCO_2H$). A concentration of 0.44 mL of $KCO_2H/K_2CO_3$ crosslinking additive with suspended sparingly-soluble borate was then admixed with 250 mL of a guar solution, and the crosslinking time determined at 100° F. (37.78° C.). The results of these comparisons are shown in Tables F, G, H and I, below.

TABLES F-I: Crosslink time comparisons for potassium formate/potassium carbonate crosslinking additives (guar pH 7, borate particles D-50 of 36 microns).

$KCO_2H/K_2CO_3$

| Crosslink Modifier Concentration Lb./Gal.[1] | Crosslink Modifier Solution Vol. %[2] | Crosslinking Additive Wt. %[3] | Crosslinking Additive pH | VC M:S | % Change | ST M:S | % Change | Final pH | % Change |
|---|---|---|---|---|---|---|---|---|---|
| TABLE F | | | | | | | | | |
| 11/0 | 100/0 | 64.13/0 | 10.64 | 1:08 | — | 1:28 | — | 8.91 | — |
| 11/11.75 | 99.37/0.63 | 63.68/0.45 | 10.71 | 1:07 | +1.5 | 1:24 | +4.5 | 8.96 | — |
| 11/11.75 | 97.49/2.51 | 62.37/1.79 | 10.88 | 1:03 | +6.0 | 1:20 | +4.8 | 8.93 | — |
| 11/11.75 | 87.49/12.51 | 55.86/8.45 | 11.37 | 0:36 | +42.9 | 0:42 | +47.5 | 9.20 | — |
| TABLE G | | | | | | | | | |
| Water | Water | Water | 8.98 | 2:15 | — | 2:37 | — | 8.93 | — |
| 9/0 | 100/0 | 59.28/0 | 9.26 | 1:09 | +48.9 | 1:26 | +45.2 | 8.98 | +0.6 |
| 11/0 | 100/0 | 64.13/0 | 10.64 | 1:08 | +49.6 | 1:28 | +43.9 | 8.91 | −0.2 |
| 9/11.75 | 97.49/2.51 | 57.51/2.02 | 9.93 | 1:05 | +51.9 | 1:20 | +49.0 | 8.93 | 0 |
| 11/11.75 | 97.49/2.51 | 62.37/1.79 | 10.88 | 1:03 | +53.3 | 1:20 | +49.0 | 8.93 | 0 |
| TABLE H | | | | | | | | | |
| 9/0 | 100/0 | 59.28/0 | 9.26 | 1:09 | — | 1:26 | — | 8.98 | — |
| 11/0 | 100/0 | 64.13/0 | 10.64 | 1:08 | +1.4 | 1:28 | −2.3 | 8.91 | — |
| 9/11.75 | 97.49/2.51 | 57.51/2.02 | 9.93 | 1:05 | — | 1:20 | — | 8.93 | — |
| 11/11.75 | 97.49/2.51 | 62.37/1.79 | 10.88 | 1.03 | +3.1 | 1:20 | 0 | 8.93 | — |
| TABLE I | | | | | | | | | |
| 9/0 | 100/0 | 59.28/0 | 9.26 | 1:09 | — | 1:26 | — | 8.98 | — |
| 9/11.75 | 97.49/2.51 | 57.51/2.02 | 9.93 | 1:05 | +5.8 | 1:20 | +7.0 | 8.93 | — |
| 11/0 | 100/0 | 64.13/0 | 10.64 | 1:08 | — | 1:28 | — | 8.91 | — |
| 11/11.75 | 97.49/2.51 | 62.37/1.79 | 10.88 | 1.03 | +7.4 | 1:20 | +9.1 | 8.93 | — |

As used in the tables herein:

[1] Concentration of $KCO_2H$ and $K_2CO_3$ in the crosslink modifier solution, such that "11/11.75" means a solution of 11 lb./gal. $KCO_2H$ and 11.75 lb./gal. $K_2CO_3$.
[2] Ratio of aqueous 9 or 11 lb./gal. $KCO_2H$ and 11.75 lb./gal. $K_2CO_3$ solutions contained in the crosslink modifier, such that "99.37/0.63" means 99.37 vol. % $KCO_2H$ and 0.63 vol. % $K_2CO_3$.
[3] Percentage by weight of 9 or 11 lb./gal. $KCO_2H$ and 11.75 lb./gal. $K_2CO_3$ crosslink modifier solutions in the crosslinking additive composition, such that "63.68/0.45" means 63.68 wt. % $KCO_2H$ and 0.45 wt. % $K_2CO_3$.

Example 5

Crosslink Time Comparison for Crosslinking Additives with Acetate Chloride Acetate/Acetic and an Acetate/Sparingly-Soluble Borate without Fines A series of crosslinking additive compositions containing a variety of crosslink modifiers were prepared and their crosslink times evaluated. In particular, mixtures comprising potassium acetate, potassium chloride, potassium acetate with the pH adjusted to 7.5 with acetic acid, and potassium acetate with greater than 325 mesh particles of sparingly-soluble borate were prepared and their crosslink times evaluated, using the methodology described herein. First, a guar solution was prepared by admixing 250 mL of Houston, Tex. tap water, 5 grams of potassium chloride (KCl, available from Univar USA, Inc., Houston, Tex.), and 0.7 grams of guar gum (WG-35™, available from Halliburton Energy Services, Inc., Duncan, Okla.). This guar solution had an initial viscosity of 16 cP @ 77° F. (25° C.), as measured on a FANN® Model 35A viscometer, (available from the Fann Instrument Company, Houston, Tex.). The pH of the resultant guar mixture was then adjusted to pH 7 with dilute acetic acid ($CH_3CO_2H$).

The 62.29 wt. % $KC_2H_3O_2$ crosslinking additive was prepared by admixing 72.83 mL of a 10.22 lb. gal. $KC_2H_3O_2$ solution, and 2 grams of attapulgite clay (FLORIGEL® HY, available from the Floridan Company, Quincy, Fla.). The solution was then blended with a Hamilton Beach mixer for approximately 15 minutes. Subsequently, 0.857 grams of low viscosity polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of finely ground ($D_{50}{\approx}36$ or $D_{-50}{\approx}36$, retained on a 325 mesh screen) ulexite from the Bigadiç region of Turkey.

Similarly, the KCl solution was prepared by combining 98.7 grams of KCl (available from Univar USA, Inc., Houston, Tex.) with 308.35 mL of Houston, Tex. tap water. The solution was mixed, and filtered through sharkskin filter paper, the filtrate being a saturated KCl solution. A base solution was then prepared using 72.83 mL of the 9.7 lb. gal. KCl solution, 2 grams of attapulgite clay (FLORIGEL® HY, available from the Floridan Company, Quincy, Fla.), 0.857 grams of low viscosity polyanionic cellulose (GABROIL® LV, available from Akzo Nobel, The Netherlands), 0.857 mL of NALCO® 9762 viscosity modifier/deflocculant (available from the Nalco Company, Sugarland, Tex.), and 49.97 grams of finely ground ($D_{50}{\approx}36$) ulexite, as described in previous aspects.

The 61.46 wt. % $KC_2H_3O_2$/0.84 wt. % $CH_3CO_2H$ crosslinking additive was prepared by admixing 71.69 mL of a 10.22 lb. gal. $KC_2H_3O_2$ solution, 1.14 mL of an 8.75 lb. gal. $CH_3CO_2H$ solution, and 2 grams of attapulgite clay (Florigel® HY, available from the Floridan Company, Quincy, Fla.). The solution was then blended with a Hamilton Beach mixer for approximately 15 minutes. Subsequently, 0.857 grams of low viscosity polyanionic cellulose (GABROIL® LV, available from Akzo Nobel, The Netherlands) was added, and the solution mixed for an additional 15 minutes, To this mixture was added 0.857 mL of NALCO® 9762 viscosity modifier/deflocculant (available from the Nalco Company, Sugarland, Tex.), and 49.97 grams of finely ground ($D_{50} \approx 36$) ulexite from the Bigadiç region of Turkey.

A concentration of 0.44 mL of $KC_2H_3O_2$, KCl, and $KC_2H_3O_2/CH_3CO_2H$ crosslinking additives with suspended sparingly-soluble borates was then admixed with 250 mL of a guar solution and the crosslinking time determined at 100° F. (37.78° C.). The results of these experiments are summarized in Table J.

able from Halliburton Energy Services, Inc., Duncan, Okla.), and had an initial viscosity at 300 rpm of 16-18 cP at 77° F. (25° C.), as measured on a FANN® model 35A viscometer. The $KC_2H_3O_2$ and $KCO_2H$ crosslinking additives were prepared, in the concentrations shown in Tables K and L, using the general methods described herein. For example, 100 mL of the 60.58 wt. % $KC_2H_3O_2/1.87$ wt. % $K_2CO_3$ crosslinking additive in Table K was prepared by admixing 71 mL of 10.22 lb. gal. $KC_2H_3O_2$ solution, 1.83 mL of an 11.75 $K_2CO_3$ solution, and 2 grams of attapulgite clay (FLORIGEL® HY, available from the Floridan Company, Quincy, Fla.). The solution was then blended with a Hamilton Beach mixer for approximately 15 minutes. Subsequently, 0.857 grams of low viscosity polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland,

TABLE J

Summary of crosslink time comparison studies for the crosslinking additives of Example 5 (guar pH 7).

| Crosslink Modifier Concentration Lb./Gal.[1] | Crosslink Modifier Solution Vol. %[2] | Crosslinking Additive Wt. %[3] | Crosslinking Additive pH | VC M:S | % Chg To Water | ST M:S | % Chg To Water | Final pH | % Chg To Water |
|---|---|---|---|---|---|---|---|---|---|
| Water | Water | Water[4] | 8.98 | 2:46 | — | 3:09 | — | 8.93 | — |
| 10.22 $KC_2H_3O_2$ | 100 | 62.29[4] | 10.65 | 0:58 | +65.1 | 1:13 | +61.4 | 8.91 | −0.2 |
| 9.7 KCl | 100 | 61.14[4] | 8.88 | 1:22 | +50.6 | 1:47 | +43.4 | 8.92 | −0.1 |
| 10.22 $KC_2H_3O_2$/ 8.75/$CH_3CO_2H$ | 98.43/1.57 | 61.46/0.84[4] | 9.20 | 1:45 | +36.7 | 2:11 | +30.7 | 8.73 | −2.2 |
| 10.22 $KC_2H_3O_2$ | 100 | 62.29[5] | 10.81 | 6:55 | −150.0 | 8:02 | −155.0 | 8.74 | −2.1 |

[1]Concentration of $KC_2H_3O_2$, KCl or $KC_2H_3O_2/CH_3CO_2H$ in the crosslink modifier solution.
[2]Ratio of aqueous 10.22 lb./gal. $KC_2H_3O_2$, 9.7 lb./gal. KCl, and 10.22 lb./gal. $KC_2H_3O_2/8.75$ lb./gal. $CH_3CO_2H$ solutions contained in the crosslink modifier.
[3]Percentage by weight of 10.22 lb. $KC_2H_3O_2$ 9.7 lb./gal. KCl, and 10.22 lb./gal. $KC_2H_3O_2/8.75$ lb./gal. $CH_3CO_2H$ crosslink modifier solutions in the crosslinking additive composition.
[4]Borate particles (D-50 of 36 microns).
[5]Borate particles (D-50 of 36 microns) retained on a 325 mesh screen.

Example 6

Alkaline Chemical Comparisons for Potassium Acetate and Potassium Formate Crosslinking Additives A series of crosslinking additive compositions comprising varying amounts of the crosslink modifiers potassium acetate ($KC_2H_3O_2$) and potassium formate ($KCO_2H$) were prepared and their crosslink times evaluated in a guar solution. In general, a guar solution having a pH of 7 was prepared as described previously herein, using a WG-35™ guar (avail- Tex.), and 49.97 grams of finely ground ($D_{50} \approx 36$) ulexite from the Bigadiç region of Turkey. The resultant crosslinking additive mixture had a pH of about 10.99.

The remaining compositions described in Tables K and L were prepared in a similar manner as this, with appropriate modifications regarding amounts of reagents depending upon the final composition of the crosslinking additive to be tested.

A concentration of 0.44 mL of $KC_2H_3O_2$ and $KCO_2H$ crosslinking additives with suspended sparingly-soluble borate was then admixed with 250 mL of a guar solution and the crosslinking time determined at 100° F. (37.78° C.). The results of these experiments are shown in Tables K and L.

TABLE K

Alkaline chemical comparisons for potassium acetate crosslinking additives (guar pH 7, borate particles D-50 of 36 microns).

| | $KC_2H_3O_2$ | | | | | | | | |
|---|---|---|---|---|---|---|---|---|---|
| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
| Water | Water | Water | 8.98 | 2:46 | — | 3:09 | — | 8.93 | — |
| 10.22/11.75 $K_2CO_3$ | 97.49/2.51 | 60.58/1.87 | 10.99 | 1:04 | +61.4 | 1:20 | +57.7 | 8.95 | +0.2 |
| 10.22/9.06 KOH | 97.49/2.51 | 60.85/1.45 | 11.00 | 1:00 | +63.9 | 1:14 | +60.8 | 9.00 | +0.8 |
| 8.90/11.75 $K_2CO_3$ | 97.49/2.51 | 57.04/2.04 | 9.91 | 0:55 | +66.9 | 1:06 | +65.1 | 8.94 | +0.1 |
| 8.90/9.06 KOH | 97.49/2.51 | 57.30/1.58 | 9.74 | 0:45 | +72.9 | 0:56 | +70.4 | 8.92 | −0.1 |

TABLE L

Alkaline chemical comparisons for potassium formate crosslinking additives (guar pH 7, borate particles D-50 of 36 microns).

| | $KCO_2H$ | | | | | | | | |
|---|---|---|---|---|---|---|---|---|---|
| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
| Water | Water | Water | 8.98 | 2:15 | — | 2:37 | — | 8.93 | — |
| 9/11.75 $K_2CO_3$ | 97.49/2.51 | 57.51/2.02 | 9.93 | 1:05 | +51.9 | 1:20 | +49.0 | 8.93 | 0 |
| 11/11.75 $K_2CO_3$ | 97.49/2.51 | 62.37/1.79 | 10.88 | 1:03 | +53.3 | 1:20 | +49.0 | 8.93 | 0 |
| 9/9.06 KOH | 97.49/2.51 | 57.78/1.56 | 9.71 | 0:56 | +58.5 | 1:13 | +53.5 | 8.95 | +0.2 |
| 11/9.06 KOH | 97.49/2.51 | 62.63/1.38 | 10.84 | 0:53 | +60.7 | 1:06 | +58.0 | 8.94 | +0.1 |

Observations Based on Low pH (pH 7.0) Guar Solution Experiments.

The results of Examples 3-6 herein, which studied the effect of a number of crosslink modifiers (e.g., salt, alkaline or acidic chemicals) in accordance with the present disclosure on the crosslinking rates/times of guar solutions at low pH (e.g., about pH 7.0), illustrate the ability of the compositions described herein to produce dramatic changes in crosslink times of well treatment fluids without altering the crosslinked system characteristics. For example, Tables C and G illustrate that the addition of salts, such as potassium acetate or potassium formate, into a water-based crosslinking additive composition reduces the crosslink time by 65.1% and 49.6%, respectively. Additionally, Table C also shows that a salt/alkaline chemical crosslink modifier solution ((e.g. 97.49 vol. % $KC_2H_3O_2$ (8.90 lb. gal.)/2.51 vol. % $K_2CO_3$ (11.75 lb. gal.)) in the crosslinking additive composition alters the crosslink time by about 66.9% while the final pH of the crosslinked system varies only 0.1%. Similarly, Table G illustrates that a 97.49 vol. % $KCO_2H$ (11 lb. gal.)/2.51 vol. % $K_2CO_3$ (11.75 lb. gal.) crosslink modifier solution in the crosslinking additive composition varies the crosslink time by about 53.3% while the final pH of the crosslinked system remains unchanged.

Tables B and F illustrate several additional, important features when used with low pH guar solutions. For example, Table B illustrates that, as the level of $K_2CO_3$ is increased to about 0.47 wt. % in the potassium acetate crosslinking additive, the crosslink time is increased, but when the level of $K_2CO_3$ increases above about 0.47 wt. %, the crosslink time is reduced as the amount of $K_2CO_3$ is increased by addition. In Table F, it is clear that, as the level of $K_2CO_3$ is increased in the potassium formate crosslinking additive, the crosslink time is reduced. Finally, Tables B and F clearly show that the addition of a salt and an alkaline reaction chemical can reduce the crosslink time to about 35 seconds even though the borate crosslinking agent has a $D_{50}$ particle size of 36 microns.

The crosslink comparison studies for Table J illustrate several important observations regarding the present disclosure. For example, it can be seen from the table that when salt is added into a water-base composition with sparingly-soluble borate and then admixed with a guar solution the crosslink times are reduced. However, the addition of an acidic chemical into the salt mixture composition will increase the crosslink time. The experiment utilizing coarse borate salt particles without fines also appears to be able to increase the crosslink time for all of the compositions studied. Finally, Table J illustrates that, in accordance with the present disclosure, salts other than acetate and formate can be used to change the crosslink times, with similar beneficial effects.

Tables K and L also demonstrate that other alkaline chemicals (e.g., potassium hydroxide) mixed in $KC_2H_3O_2$ and $KCO_2H$ solutions can be used to accelerate crosslink times in low pH guar solutions. For example, crosslink modifier solutions of 97.49 vol. % $KC_2H_3O_2$ (8.90 lb. gal.)/2.51 vol. % KOH (9.06 lb. gal.) and 97.49 vol. % $KCO_2H$ (11 lb. gal.)/2.51 vol. % KOH (9.06 lb. gal.) in the crosslinking additive compositions can alter the crosslink time by 72.9% and 60.7%, respectively, as compared to a system crosslinked by a water-based crosslinking additive.

Example 7

Evaluation of the Effect of Incremental Increases in the Amount of Acetic Acid and Formic Acid in Potassium Acetate and Potassium Formate Crosslinking Additives A series of crosslinking additive compositions comprising varying amounts of the crosslink modifiers potassium acetate ($KC_2H_3O_2$)/acetic acid ($CH_3CO_2H$) and potassium formate ($KCO_2H$)/formic acid ($HCO_2H$) were prepared and their crosslink times evaluated in HPG solutions. In general, a hydroxypropyl guar (HPG) solution was prepared, by combining 0.96 grams of HPG (GW-32™, available from BJ Services, Tomball, Tex.) in 200 mL of Houston, Tex. tap water. The HPG solution had an initial viscosity as measured by a FANN® model 35A viscometer at 300 rpm of 29-33 cP @77° F., and a pH of 8.0-8.4 before adjusting to a pH of 11.6 using dilute NaOH.

The $KC_2H_3O_2/CH_3CO_2H$ and $KCO_2H/HCO_2H$ crosslinking additives were prepared as generally described herein, by combining the required amounts of 10.22 lb. gal. $KC_2H_3O_2$ or 11 lb. gal. $KCO_2H$ with from 0% to 1.97 wt. % of acetic acid or formic acid, an attapulgite clay (FLORIGEL® HY, available from the Floridan Company, Quincy, Fla.), a low viscosity polyanionic cellulose (GABROIL® LV, available from Akzo Nobel, The Netherlands), NALCO® 9762 viscosity modifier/deflocculant (available from the Nalco Company, Sugarland, Tex.), and very finely ground ($D_{50}{\approx}11$) ulexite, from the Bigadiç region of Turkey.

A concentration of 0.50 mL of $KC_2H_3O_2/CH_3CO_2H$ and $KCO_2H/HCO_2H$ crosslinking additives with suspended sparingly-soluble borate was then admixed with 200 mL of the HPG solution and the crosslinking time was determined at 80° F. (26.67° C.). The results of these experiments are shown in Tables M and N, below.

TABLE M

Effect of incremental increases of acetic acid in a potassium acetate crosslinking additive (HPG pH 11.6, borate particles D-50 of 11 microns).

$KC_2H_3O_2/CH_3CO_2H$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 10.22/0 | 100/0 | 62.29/0 | 10.72 | 10:04 | +16.0 | 11:32 | +17.5 | 11.14 | −2.6 |
| 10.22/8.75 | 98.23/1.77 | 61.28/0.88 | 8.81 | 2:58 | +75.2 | 3:53 | +72.2 | 11.10 | −3.0 |
| 10.22/8.75 | 96.67/3.33 | 60.43/1.75 | 8.18 | 1:38 | +86.4 | 2:02 | +85.5 | 10.82 | −5.4 |

TABLE N

Effect of incremental increases of formic acid in a potassium formate crosslinking additive (HPG pH 11.6, borate particles D-50 of 11 microns).

$KCO_2H/HCO_2H$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 11/0 | 100/0 | 64.13/0 | 10.72 | 7:57 | +33.7 | 11:08 | +20.4 | 11.33 | −1.0 |
| 11/10.16 | 98.23/1.77 | 63.05/0.97 | 9.61 | 2:26 | +79.7 | 3:15 | +76.8 | 11.26 | −1.6 |
| 11/10.16 | 96.67/3.33 | 62.09/1.97 | 9.00 | 1:15 | +89.6 | 1:39 | +88.2 | 11.10 | −3.0 |

Example 8

Acidic Chemical Comparisons for Potassium Acetate and Potassium Formate Crosslinking Additives A series of crosslinking additive compositions comprising varying amounts of the crosslink modifiers potassium acetate ($KC_2H_3O_2$) and potassium formate ($KCO_2H$) with acids were prepared and their crosslink times evaluated in HPG solutions. In general, the HPG solution was prepared as described in Example 7, herein, using GW-$_{32}$™, (available from BJ Services, Tomball, Tex.) and had an initial viscosity at 300 rpm of 29-33 cP at 77° F. (25° C.), as measured on a FANN® model 35A viscometer, and an initial pH of 8.0-8.4 prior to adjustment to pH 11.6 with dilute NaOH. The $KC_2H_3O_2$ and $KCO_2H$ crosslinking additive solutions were prepared, in the concentrations shown in Tables O and P, using the general methods described herein. For example, 100 mL of the 60.30 wt. % $KC_2H_3O_2$/1.97 wt. % HCl crosslinking additive in Table 0 was prepared by admixing 70.4 mL of 10.22 lb. gal. $KC_2H_3O_2$ solution, 2.43 mL of a 9.83 lb. gal. HCl solution, and 2 grams of attapulgite clay (FLORIGEL® HY, available from the Floridan Company, Quincy, Fla.). The solution was then blended with a Hamilton Beach mixer for approximately 15 minutes. Subsequently, 0.857 grams of polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of very finely ground ($D_{50}≈11$) ulexite from the Bigadiç region of Turkey. The resultant crosslinking additive mixture had a pH of about 8.04.

The remaining compositions described in Tables O and P were prepared in a similar manner as this, with appropriate modifications regarding amounts of reagents (e.g., HCl, $CH_3CO_2H$, or $HCO_2H$), depending upon the final composition of the crosslinking additive to be tested.

A concentration of 0.50 mL of $KC_2H_3O_2$ and $KCO_2H$ crosslinking additives with suspended sparingly-soluble borate was then admixed with 200 mL of the HPG solution and the crosslinking time was determined at 80° F. (26.67° C.). The results of these experiments are shown in Tables O and P.

TABLE O

Acidic chemical comparisons for potassium acetate crosslinking additives (HPG pH 11.6, borate particles D-50 of 11 microns).

$KC_2H_3O_2$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 10.22/9.83 HCl | 98.23/1.77 | 61.29/0.98 | 8.77 | 5:48 | +51.6 | 7:17 | +47.9 | 11.28 | −1.4 |
| 10.22/9.83 HCl | 96.67/3.33 | 60.30/1.97 | 8.04 | 2:18 | +80.8 | 2:54 | +79.3 | 11.09 | −3.1 |
| 10.22/8.75 $CH_3CO_2H$ | 98.23/1.77 | 61.28/0.88 | 8.81 | 2:58 | +75.2 | 3:53 | +72.2 | 11.10 | −3.0 |
| 10.22/8.75 $CH_3CO_2H$ | 96.67/3.33 | 60.43/1.75 | 8.18 | 1:38 | +86.4 | 2:02 | +85.5 | 10.82 | −5.4 |

TABLE P

Acidic chemical comparisons for potassium formate crossliking additives (HPG pH 11.6, borate particles D-50 of 11 microns).

$KCO_2H$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 11/9.83 HCl | 98.23/1.77 | 63.07/0.94 | 8.88 | 2:12 | +81.6 | 2:51 | +79.6 | 11.16 | −2.4 |
| 11/9.83 HCl | 96.67/3.33 | 62.13/1.88 | 8.89 | 1:53 | +84.3 | 2:26 | +82.6 | 10.92 | −4.5 |
| 11/10.16 $HCO_2H$ | 98.23/1.77 | 63.05/0.97 | 9.61 | 2:26 | +79.7 | 3:15 | +76.8 | 11.26 | −1.6 |
| 11/10.16 $HCO_2H$ | 96.67/3.33 | 62.09/1.97 | 9.00 | 1:15 | +89.6 | 1:39 | +88.2 | 11.10 | −3.0 |

Example 9

Evaluation of the Incremental Increase of Potassium Carbonate or Acetic Acid in Potassium Acetate Crosslinking Additives A series of crosslinking additive compositions comprising the crosslink modifiers potassium acetate ($KC_2H_3O_2$) and varying amounts of potassium carbonate ($K_2CO_3$) or acetic acid ($CH_3CO_2H$) were prepared and their crosslink times evaluated in HPG solutions. In general, the HPG (hydroxypropyl guar) solution was prepared as described in Example 7, herein, using GW-32™, (available from BJ Services, Tomball, Tex.) and had an initial viscosity at 300 rpm of 29-33 cP at 77° F. (25° C.), as measured on a FANN® model 35A viscometer, and an initial pH of 8.0-8.4 prior to adjustment to pH 11.6 with dilute NaOH. The $KC_2H_3O_2$ crosslinking additive solutions were prepared, in the concentrations shown in Tables Q and R, using the general methods described herein. For example, 100 mL of the 61.28 wt. % $KC_2H_3O_2$/0.88 wt. % $CH_3CO_2H$ crosslinking additive in Table R was prepared by admixing 71.54 mL of 10.22 lb. gal. $KC_2H_3O_2$ solution, 1.29 mL of an 8.75 lb. gal. $CH_3CO_2H$ solution, and 2 grams of attapulgite clay (FLORIGEL® HY, available from the Floridan Company, Quincy, Fla.). The solution was then blended with a Hamilton Beach mixer for approximately 15 minutes. Subsequently, 0.857 grams of polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of very finely ground ($D_{50}$≈11) ulexite from the Bigadiç region of Turkey. The resultant crosslinking additive mixture had a pH of about 8.81.

The remaining compositions described in Tables Q and R were prepared in a similar manner as this, with appropriate modifications regarding amounts of reagents (e.g., $K_2CO_3$ or $CH_3CO_2H$), depending upon the final composition of the crosslinking additive to be tested.

A concentration of 0.50 mL of $KC_2H_3O_2/K_2CO_3$ or $KC_2H_3O_2/CH_3CO_2H$ crosslinking additives with suspended sparingly-soluble borate was then admixed with 200 mL of the HPG (hydroxypropyl guar) solution and the crosslinking time was determined at 80° F. (26.67° C.). The results of these experiments are shown in Tables Q and R.

TABLE Q

Results of incremental increases of potassium carbonate content in potassium acetate crosslinking additives (HPG pH 11.6, borate particles D-50 of 11 microns).

$KC_2H_3O_2/K_2CO_3$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 10.22/11.75 | 100/0 | 62.29/0 | 10.72 | 10:04 | +16.00 | 11:32 | +17.5 | 11.14 | −2.6 |
| 10.22/11.75 | 97.49/2.51 | 60.58/1.87 | 10.92 | 8:51 | +26.15 | 10:59 | +21.45 | 11.14 | −2.6 |
| 10.22/11.75 | 93.76/6.24 | 58.00/4.44 | 11.24 | 5:19 | +55.63 | 7:00 | +49.94 | 11.19 | −.2.2 |
| 10.22/11.75 | 87.49/12.51 | 53.91/8.82 | 11.66 | 1:20 | +88.87 | 1:44 | +87.60 | 11.15 | −2.5 |
| 10.22/11.75 | 82.50/17.50 | 52.20/12.45 | 11.79 | 1:12 | +89.99 | 1:32 | +89.03 | 11.18 | −2.3 |

TABLE R

Results of incremental increases of acetic acid content in potassium acetate crosslinking additives (HPG pH 11.6, borate particles D-50 of 11 microns).

$KC_2H_3O_2/CH_3CO_2H$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 8.94 | 11:59 | — | 13:59 | — | 11.44 | — |
| 10.22/8.75 | 100/0 | 62.29/0 | 10.72 | 10:04 | +16.00 | 11:32 | +17.5 | 11.14 | −2.6 |
| 10.22/8.75 | 99.61/0.39 | 62.11/0.18 | 9.99 | 7:32 | +37.10 | 9:09 | +34.60 | 11.14 | −2.6 |

TABLE R-continued

Results of incremental increases of acetic acid content in potassium acetate crosslinking additives (HPG pH 11.6, borate particles D-50 of 11 microns).

$KC_2H_3O_2/CH_3CO_2H$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| 10.22/8.75 | 99.02/0.98 | 61.73/0.53 | 9.38 | 5:47 | +51.70 | 7:50 | +44.00 | 11.12 | −2.8 |
| 10.22/8.75 | 98.23/1.77 | 61.28/0.88 | 8.81 | 2:58 | +75.20 | 3:53 | +72.20 | 11.10 | −3.0 |
| 10.22/8.75 | 96.67/3.33 | 60.43/1.75 | 8.18 | 1:38 | +86.40 | 2:02 | +85.50 | 10.82 | −5.4 |

Example 10

Evaluation of Increased Particle Size in Potassium Acetate/Potassium Carbonate Crosslinking Additives A series of crosslinking additive compositions comprising the crosslink modifiers potassium acetate ($KC_2H_3O_2$) and varying amounts of potassium carbonate ($K_2CO_3$) with a larger particle size distribution of sparingly-soluble borates was prepared and their crosslink times evaluated in HPG (hydroxypropyl guar) solutions. In general, the HPG solution was prepared as described herein, using GW-32™, (available from BJ Services, Tomball, Tex.) and had an initial viscosity at 300 rpm of 29-33 cP at 77° F. (25° C.), as measured on a FANN® model 35A viscometer, and an initial pH of 8.0-8.4 prior to adjustment to pH 11.6 with dilute NaOH. The $KC_2H_3O_2/K_2CO_3$ crosslinking additives were prepared, in the concentrations shown in Table S, using the general methods described herein. For example, 100 mL of the 58.0 wt. % $KC_2H_3O_2/4.44$ wt. % $K_2CO_3$ crosslinking additive in Table S was prepared by admixing 68.29 mL of 10.22 lb. gal. $KC_2H_3O_2$ solution, 4.54 mL of an 11.75 lb. gal. $K_2CO_3$ solution, and 2 grams of attapulgite clay (FLORIGEL® HY, available from the Floridan Company, Quincy, Fla.). The solution was then blended with a Hamilton Beach mixer for approximately 15 minutes. Subsequently, 0.857 grams of polyanionic cellulose (GABROIL® LV, available from Akzo Nobel, The Netherlands) was added, and the solution mixed for an additional 15 minutes. To this mixture was added 0.857 mL of NALCO® 9762 viscosity modifier/deflocculant (available from the Nalco Company, Sugarland, Tex.), and 49.97 grams of finely ground ($D_{50}\approx36$) ulexite from the Bigadiç region of Turkey. The resultant crosslinking additive mixture had a pH of about 11.35.

The remaining compositions described in Table S were prepared in a similar manner as this, with appropriate modifications regarding amounts of reagents (e.g., $KC_2H_3O_2$ or $K_2CO_3$), depending upon the final composition of the crosslinking additive to be tested.

A concentration of 0.50 mL of $KC_2H_3O_2/K_2CO_3$ crosslinking additive with suspended sparingly-soluble borate was then admixed with 200 mL of the HPG solution and the crosslinking time was determined at 80° F. (26.67° C.). The results of these experiments are shown in Table S, below.

TABLE S

The effect of sparingly-soluble borate particle size on crosslink time (HPG pH 11.6, borate particles D-50 of 36 microns).

$KC_2H_3O_2/K_2CO_3$

| Crosslink Modifier Concentration Lb./Gal. | Crosslink Modifier Solution Vol. % | Crosslinking Additive Wt. % | Crosslinking Additive pH | VC M:S | % Chg To Water | ST M:S | % Chg To Water | Final pH | % Chg To Water |
|---|---|---|---|---|---|---|---|---|---|
| Water | Water | Water | 9.02 | 15:51 | — | 18:31 | — | 11.07 | — |
| 10.22/11.75 | 97.49/2.51 | 60.58/1.87 | 11.04 | 14:35 | +8.00 | 17:01 | +8.1 | 11.32 | +2.3 |
| 10.22/11.75 | 93.76/6.24 | 58.00/4.44 | 11.35 | 8:08 | +48.69 | 10:27 | +43.56 | 11.26 | +1.7 |
| 10.22/11.75 | 87.49/12.51 | 53.91/8.82 | 11.62 | 3:47 | +76.13 | 5:07 | +72.37 | 11.25 | +1.6 |
| 10.22/11.75 | 82.50/17.50 | 52.20/9.57 | 11.89 | 2:09 | +86.44 | 2:59 | +83.89 | 11.32 | +2.3 |

Observations Based on High pH (pH 11.6) HPG Solution Experiments.

The results of Examples 7-10 herein, which studied the effect of a number of crosslink modifiers (e.g., salt, alkaline or acidic chemicals) in accordance with the present disclosure on the crosslinking rates/times of HPG solutions. At high pH (e.g., about pH 11.6), the examples also illustrate the ability of the compositions described herein to produce dramatic changes in crosslink times of well treatment fluids without altering the crosslinked system characteristics.

Tables M and N illustrate that at high pH values, such as at a pH value of 11.6, crosslinking times for HPG solutions system are greater than 12 minutes with very fine particles in the water-based crosslinking additives. These tables also illustrate that the addition of a salt, such as potassium formate, into a water-based crosslinking additive composition, will reduce crosslink times over 30%, and the addition of both a salt and an acid into the crosslinking additive composition reduces the crosslink times by greater than 80% (compared with the water-based composition), to below 1:45. Additionally, Table M shows that a 96.67 vol. % $KC_2H_3O_2$ (10.22 lb. gal)/3.33 vol. % $CH_3CO_2H$ (8.75 lb. gal.) crosslink modifier solution in the crosslinking additive composition alters the crosslink time by 86.4% while the final pH of the crosslinked system varies only 5.4%. Similarly, Table N illustrates that a 96.67 vol. % $KCO_2H$ (11 lb. gal.)/3.33 vol. % $HCO_2H$ (10.16 lb. gal.) crosslink modifier solution in the crosslinking additive composition varies the crosslink time by 89.6% while the final pH of the crosslinked system changes only 3.0%.

The crosslink comparison studies for Tables O and P illustrate that acids, other than acetic or formic (e.g., hydrochloric)

can be used to accelerate the crosslink times of water-based HPG systems. For example, crosslink modifier solutions of 96.67 vol. % $KC_2H_3O_2$ (10.22 lb. gal)/3.33 vol. % HCl (9.83 lb. gal.) and 96.67 vol. % $KCO_2H$ (11 lb. gal.)/3.33 vol. % HCl (9.83 lb. gal.) in the crosslinking additive compositions can alter the crosslink time by over 80% as compared to a system crosslinked by a water-based crosslinking additive.

Tables Q and R demonstrate that incremental increases of the crosslink modifiers $K_2CO_3$ and $CH_3CO_2H$ with decreasing amounts of $KC_2H_3O_2$ will progressively accelerate crosslink times in HPG solutions at high pH.

The results of the experiments in Table S, indicate that, in contrast to the results shown in Table Q, high pH HPG solutions are affected by the particle size of the sparingly-soluble borate crosslinking agent. As exemplified in entry 1 of Tables Q and S, the vortex closure (VC) time is extended 32.3% by varying the D-50 particle size from 11 microns to 36 microns in a water-based crosslinking additive.

The order of steps described herein can occur in a variety of sequences unless otherwise specifically limited. The various steps described herein can also optionally be combined with other steps, interlineated with the stated steps, and/or split into multiple steps. Similarly, elements have been described functionally and can be embodied as separate components or can be combined into components having multiple functions.

The inventions have been described in the context of preferred and other embodiments, but not every embodiment of the inventions has been described. Obvious modifications and alterations to the described embodiments are available to those of ordinary skill in the art. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalent of the following claims.

What is claimed is:

1. A method of treating a subterranean formation, the method comprising:
   generating a treating fluid by mixing an aqueous base fluid and a crosslinking additive-and delivering the treating fluid into a subterranean formation; wherein the aqueous base fluid comprises a crosslinkable organic polymer, and wherein
   the crosslinking additive comprises a borate crosslinking agent premixed with one or more crosslinking modifiers selected from the group consisting of an acidic chemical.

2. The method of claim 1, wherein the borate crosslinking agent is an alkaline earth metal borate, an alkali metal-alkaline earth metal borate, or an alkali metal borate containing at least 2 boron atoms per molecule.

3. The method of claim 2 wherein the borate is selected from the group consisting of ulexite, colemanite, probertite, and mixtures thereof.

4. The method of claim 1, further comprising delivering an inorganic or organic peroxide breaker into the subterranean formation.

5. The method of claim 4, wherein the inorganic or organic peroxide breaker is slightly soluble in water.

6. A composition for crosslinking an aqueous, crosslinkable organic polymer solution, the composition comprising:
   crosslinking additive comprising a sparingly-soluble borate crosslinking agent and a crosslinking modifier selected from the group consisting of an acidic chemical; wherein
   the crosslinking additive is capable of crosslinking the organic polymer at a modified rate compared to a water-based crosslinking additive having the same borate concentration but lacking the crosslinking modifier.

7. The composition of claim 6, wherein the crosslinkable viscosifying organic polymer is a polysaccharide.

8. The composition of claim 7, wherein the polysaccharide is guar, cellulose, starch, galactomannan gum, xanthan, succinoglycan or scleroglucan or a derivative thereof.

9. The composition of claim 8, wherein the polysaccharide is selected from the group consisting of guar, hydroxypropyl guar, carboxymethylhydroxypropyl guar, methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose or carboxymethylhydroxyethyl cellulose.

10. The composition of claim 6, wherein the sparingly-soluble borate is an alkaline earth metal borate, an alkali metal-alkaline earth metal borate, or an alkali metal borate containing at least two boron atoms per molecule.

11. The composition of claim 10, wherein the sparingly-soluble borate is selected from the group consisting of ulexite, colemanite, probertite, and mixtures thereof.

12. The composition of claim 6, wherein the concentration of sparingly-soluble borate is in the range from about from about 0.1 $kg/m^3$ to about 5 $kg/m^3$.

13. The composition of claim 6, wherein the composition further comprises a suspension agent selected from the group consisting of clays, polymers, and combinations thereof.

14. The composition of claim 13, wherein the suspension agent is selected from the group consisting of palygorskite-type clays consisting of attapulgite, smectite, sepiolite, and composite mixtures thereof.

15. A composition for crosslinking aqueous, crosslinkable organic polymer solutions, wherein the composition is prepared by a process comprising:
   mixing a borate-containing crosslinking agent and a crosslinking modifier selected from the group consisting of an acidic chemical.

16. The composition of claim 6, wherein the modified rate is accelerated.

17. The method of claim 1, wherein the crosslinking additive further comprises a suspension agent selected from the group consisting of clays, polymers, and combinations thereof.

18. The method of claim 17, wherein the suspension agent is selected from the group consisting of palygorskite-type clays consisting of attapulgite, smectite, sepiolite, and composite mixtures thereof.

19. The method of claim 17, wherein the polymer is a water-soluble polymer selected from the group consisting of biopolymers, naturally-occurring polymers, derivatives thereof, and combinations thereof.

20. The method of claim 1, wherein the crosslinking additive comprises a deflocculant.

21. The method of claim 1, wherein the crosslinking additive comprises one or more chelating agents.

22. The method of claim 1, wherein the crosslinking additive comprises a friction reducer.

23. The composition of claim 6, wherein the crosslinking additive comprises a freeze-point depressant.

24. The composition of claim 6, wherein the crosslinking additive comprises a clay, a polymer, or combinations thereof.

25. The composition of claim 24, wherein the crosslinking additive comprises a clay selected from the group consisting of palygorskite-type clays consisting of attapulgite, smectite, sepiolite, and composite mixtures thereof.

26. The composition of claim 24, wherein the crosslinking additive comprises a water-soluble polymer selected from the group consisting of biopolymers, naturally-occurring polymers, derivatives thereof, and combinations thereof.

27. The composition of claim 6, wherein the crosslinking additive comprises a deflocculant.

28. The composition of claim 6, wherein the crosslinking additive comprises one or more chelating agents.

29. The composition of claim 6, wherein the crosslinking additive comprises a friction reducer.

30. The composition of claim 13, wherein the polymer is a water-soluble polymer selected from the group consisting of biopolymers, naturally-occurring polymers, derivatives thereof, and combinations thereof.

* * * * *